US011253812B2

(12) United States Patent
Suzuki et al.

(10) Patent No.: US 11,253,812 B2
(45) Date of Patent: Feb. 22, 2022

(54) APPARATUS AND METHOD FOR RECOVERING CARBON DIOXIDE IN COMBUSTION EXHAUST GAS

(71) Applicants: ANEMOS COMPANY LTD., Tokyo (JP); Terutoshi Suzuki, Aichi (JP)

(72) Inventors: Terutoshi Suzuki, Aichi (JP); Hisao Kojima, Kanagawa (JP); Teruhiko Suzuki, Tokyo (JP); Shinji Kojima, Tokyo (JP)

(73) Assignees: ANEMOS COMPANY LTD., Tokyo (JP); Terutoshi Suzuki, Aichi (JP)

( * ) Notice: Subject to any disclaimer, the term of this patent is extended or adjusted under 35 U.S.C. 154(b) by 35 days.

(21) Appl. No.: 16/499,992

(22) PCT Filed: Mar. 23, 2018

(86) PCT No.: PCT/JP2018/011902

§ 371 (c)(1),
(2) Date: Oct. 1, 2019

(87) PCT Pub. No.: WO2018/190104

PCT Pub. Date: Oct. 18, 2018

(65) Prior Publication Data

US 2020/0061525 A1 Feb. 27, 2020

(30) Foreign Application Priority Data

Apr. 12, 2017 (JP) ............................ JP2017-090662

(51) Int. Cl.
*B01D 53/14* (2006.01)
*B01D 53/18* (2006.01)
(Continued)

(52) U.S. Cl.
CPC ..... *B01D 53/1475* (2013.01); *B01D 53/1425* (2013.01); *B01D 53/1431* (2013.01);
(Continued)

(58) Field of Classification Search
CPC ........ B01D 2251/304; B01D 2251/404; B01D 2251/604; B01D 2251/606;
(Continued)

(56) References Cited

U.S. PATENT DOCUMENTS 5,605,400 A 2/1997 Kojima
6,784,320 B2 8/2004 Mimura et al.
(Continued)

FOREIGN PATENT DOCUMENTS

JP 7-284642 10/1995
JP 2008-168262 7/2008
(Continued)

OTHER PUBLICATIONS

JP-2012213752 machine translation—ESPACENET (Year: 2021).*
(Continued)

*Primary Examiner* — Cabrena Holecek
(74) *Attorney, Agent, or Firm* — Greenblum & Bernstein, P.L.C.

(57) ABSTRACT

The present invention relates to an apparatus and method for recovering carbon dioxide (hereinafter also referred to as "$CO_2$") contained in a combustion exhaust gas, and more specifically relates to: an apparatus and method for reactively absorbing $CO_2$ contained in a combustion exhaust gas into an amine compound-containing absorption liquid; an apparatus and method for desorbing $CO_2$ contained in an amine compound-containing absorption liquid from the amine compound-containing absorption liquid; an apparatus and method for evaporating and separating impurities from the amine compound-containing absorption liquid containing the impurities; an apparatus and method for performing a pretreatment such as desulfurization, dust removal, and
(Continued)

cooling on a combustion exhaust gas; and a carbon dioxide-recovering apparatus and method utilizing the above apparatuses and methods.

3 Claims, 11 Drawing Sheets

(51) Int. Cl.

| | |
|---|---|
| ***B01D 53/62*** | (2006.01) |
| ***B01D 53/48*** | (2006.01) |
| ***B01D 53/96*** | (2006.01) |
| ***C01B 32/50*** | (2017.01) |
| ***B01D 53/78*** | (2006.01) |
| ***F01N 3/08*** | (2006.01) |

(52) U.S. Cl.
CPC ......... *B01D 53/1493* (2013.01); *B01D 53/18* (2013.01); *B01D 53/62* (2013.01); *B01D 53/78* (2013.01); *B01D 53/96* (2013.01); *C01B 32/50* (2017.08); *F01N 3/08* (2013.01); *F01N 3/0857* (2013.01); *B01D 2252/20484* (2013.01); *B01D 2252/20489* (2013.01); *B01D 2257/30* (2013.01); *B01D 2257/504* (2013.01); *Y02C 20/40* (2020.08)

(58) Field of Classification Search
CPC .... B01D 2252/204; B01D 2252/20405; B01D 2252/2041; B01D 2252/20426; B01D 2252/20431; B01D 2252/20484; B01D 2252/20489; B01D 2257/30; B01D 2257/504; B01D 53/1425; B01D 53/1431; B01D 53/1475; B01D 53/1493; B01D 53/18; B01D 53/62; B01D 53/78; B01D 53/96; C01B 32/50; F01N 3/08; F01N 3/0857; Y02C 10/06; Y02C 20/40; Y02P 20/151
See application file for complete search history.

(56) References Cited

U.S. PATENT DOCUMENTS

| | | | | |
|---|---|---|---|---|
| 7,316,737 | B2 | 1/2008 | Mimura et al. | |
| 7,601,315 | B2 | 10/2009 | Ouimet | |
| 8,486,357 | B1 * | 7/2013 | Ito | B01D 53/1406 423/228 |
| 2007/0205523 | A1 * | 9/2007 | Kojima | B01J 19/32 261/79.2 |
| 2008/0169576 | A1 | 7/2008 | Kojima | |
| 2009/0071336 | A1 | 3/2009 | Jernberg | |
| 2011/0085956 | A1 | 4/2011 | Jernberg | |
| 2013/0205796 | A1 * | 8/2013 | Christensen | B01D 53/1418 60/772 |
| 2016/0361682 | A1 | 12/2016 | Yukumoto et al. | |

FOREIGN PATENT DOCUMENTS

| | | |
|---|---|---|
| JP | 2012-213752 | 11/2012 |
| JP | 2012213752 A * | 11/2012 |
| JP | 2015-151319 | 8/2015 |
| WO | 2005/077506 | 8/2005 |

OTHER PUBLICATIONS

Official Communication issued in International Bureau of WIPO Patent Application No. PCT/JP2018/011902, dated Jun. 12, 2018 (with English translation).

* cited by examiner

ABSORPTION LIQUID PURIFICATION APPARATUS

PRETREATMENT TOWER

[Table 1]

[Table 2]

| | Pretreatment tower | $CO_2$ absorption tower | $CO_2$ desorption tower |
|---|---|---|---|
| Gas flow rate in tower | 460,000 $Nm^3$/hour (600,000 $m^3$/hour at 80°C) | 460,000 $Nm^3$/hour (540,000 $m^3$/hour at 50°C) | 58,000 $Nm^3$/hour (80,000 $m^3$/hour at 100°C) |
| Conventional general packing | ϕ 15 m × 20 mH <countercurrent> | ϕ 14 m × 20 mH <countercurrent> | ϕ 7.5 m × 20 mH <countercurrent> |
| ⬇ High-performance packing | ϕ 5.5 m × 12 mH <concurrent reaction tower> | ϕ 5.2 m × 12 mH <concurrent reaction tower> | ϕ 3.0 m × 10 mH <countercurrent> |
| Tower diameter reduction ratio | 63% | 63% | 60% |

FIG. 11

APPARATUS AND METHOD FOR RECOVERING CARBON DIOXIDE IN COMBUSTION EXHAUST GAS

TECHNICAL FIELD

The present invention relates to an apparatus and method for recovering carbon dioxide (hereinafter also referred to as "$CO_2$") contained in a combustion exhaust gas, and more specifically relates to: an apparatus and method for reactively absorbing $CO_2$ contained in a combustion exhaust gas into an amine compound-containing absorption liquid; an apparatus and method for desorbing $CO_2$ contained in an amine compound-containing absorption liquid from the amine compound-containing absorption liquid; an apparatus and method for evaporating and separating impurities contained in an amine compound-containing absorption liquid from the amine compound-containing absorption liquid; an apparatus and method for performing a pretreatment such as desulfurization, dust removal, and cooling on a combustion exhaust gas; and a carbon dioxide-recovering apparatus and method utilizing the above apparatuses and methods.

BACKGROUND ART

In response to the request for emission control of $CO_2$, a method for bringing a combustion gas discharged from a combustion device such as a boiler into contact with an aqueous solution of an amine compound or the like to remove and recover the $CO_2$ contained in the combustion gas, and a method for storing the recovered $CO_2$ have been extensively studied. With the practical use of these methods, the increase in size of the device, the blockage of the device due to the contamination of the absorption liquid, and the high energy consumption rate have been regarded as problems.

SUMMARY

Problems to be Solved by the Invention

In a step (absorption step) of absorbing $CO_2$ contained in a combustion exhaust gas by using an absorption liquid composed of an aqueous solution of an amine compound, the absorption liquid that has absorbed $CO_2$ is regenerated by desorbing the $CO_2$ in the subsequent $CO_2$ desorption step (also referred to as "absorption liquid regeneration step"), and therefore, the absorption liquid is recycled into the absorption step and used repeatedly. It is desired to efficiently absorb $CO_2$ in the absorption step and similarly, to efficiently desorb $CO_2$ from the absorption liquid because the circulation amount of the absorption liquid is reduced, the miniaturization of the device is achieved, and further the energy saving of the whole process is realized. Further, in the circulation operation, the absorption liquid is contaminated with the lapse of time and the absorption performance is lowered, the circulation amount of the absorption liquid is increased, the dirt of the device is generated, the required energy is increased, the operation time is decreased, and the disadvantages of spare machine installation and the like are generated. In order to prevent these situations, it is necessary to purify the absorption liquid and to restore and maintain the absorption capacity at all times. In addition, also in a pretreatment step of a combustion exhaust gas, the similar problems are required to be solved.

Means of Solving the Problems

As a result of the intensive studies to solve the problems described above, the present inventors have introduced improvement techniques to each apparatus and each method which constitute a carbon dioxide recovery facility and a carbon dioxide recovery method, respectively.

That is, according to a first aspect of the present invention, a carbon dioxide-absorbing apparatus comprising: a $CO_2$ absorption tower for reactively absorbing $CO_2$ contained in a combustion exhaust gas into an amine compound-containing absorption liquid; and at least one cooler selected from the group consisting of a first cooler for cooling an amine compound-containing absorption liquid and a second cooler for cooling a liquid different from the amine compound-containing absorption liquid, the $CO_2$ absorption tower being provided with a combustion exhaust gas inlet port for introducing the combustion exhaust gas into the $CO_2$ absorption tower, a combustion exhaust gas outlet port for discharging the combustion exhaust gas from the $CO_2$ absorption tower, an absorption liquid inlet port for introducing the amine compound-containing absorption liquid into the $CO_2$ absorption tower, an absorption liquid outlet port for discharging the amine compound-containing absorption liquid from the $CO_2$ absorption tower, and a packing that is a static-type mixer having a spiral porous blade, in which the packing is arranged between the combustion exhaust gas inlet port and the combustion exhaust gas outlet port and between the absorption liquid inlet port and the absorption liquid outlet port, the first cooler being provided with an absorption liquid recovery port for recovering the amine compound-containing absorption liquid from the $CO_2$ absorption tower, and an absorption liquid supply port for supplying the amine compound-containing absorption liquid to the $CO_2$ absorption tower, in which the absorption liquid recovery port is connected to the $CO_2$ absorption tower at a position on the downstream side of the packing in a flow direction of the amine compound-containing absorption liquid toward the absorption liquid outlet port from the absorption liquid inlet port, and the absorption liquid supply port is connected to the $CO_2$ absorption tower at a position on the upstream side of the packing in the flow direction of the amine compound-containing absorption liquid, and the second cooler being provided with a liquid supply port for supplying the liquid to be brought into contact with the combustion exhaust gas to the $CO_2$ absorption tower, and a liquid recovery port for recovering the liquid brought into contact with the combustion exhaust gas from the $CO_2$ absorption tower, in which the liquid supply port and the liquid recovery port are connected to the $CO_2$ absorption tower at a position on the downstream side of the packing in a flow direction of the combustion exhaust gas toward the combustion exhaust gas outlet port from the combustion exhaust gas inlet port, is provided.

According to a second aspect of the present invention, a method for absorbing carbon dioxide, comprising:

a first step of bringing a combustion exhaust gas containing $CO_2$ into countercurrent or concurrent contact with an amine compound-containing absorption liquid in a packing to reactively absorb the $CO_2$ contained in the combustion exhaust gas into the amine compound-containing absorption liquid, in which the combustion exhaust gas flows from a combustion exhaust gas inlet port to a combustion exhaust gas outlet port and the amine compound-containing absorption liquid flows from an absorption liquid inlet port to an absorption liquid outlet port, in a $CO_2$ absorption tower being provided with the combustion exhaust gas inlet port for introducing the combustion exhaust gas into the $CO_2$ absorption tower, the combustion exhaust gas outlet port for discharging the combustion exhaust gas from the $CO_2$ absorption tower, the absorption liquid inlet port for introducing the amine compound-containing absorption liquid into the $CO_2$ absorption tower, the absorption liquid outlet port for discharging the amine compound-containing absorption liquid from the $CO_2$ absorption tower, and the packing that is a static-type mixer having a spiral porous blade; and at least one step selected from the group consisting of a second step of recovering a part of the amine compound-containing absorption liquid from the $CO_2$ absorption tower at a position on the downstream side of the packing in a flow direction of the amine compound-containing absorption liquid toward the absorption liquid outlet port from the absorption liquid inlet port, cooling the recovered amine compound-containing absorption liquid, and supplying the cooled amine compound-containing absorption liquid to the $CO_2$ absorption tower at a position on the upstream side of the packing in the flow direction of the amine compound-containing absorption liquid, and a third step of supplying a liquid to the $CO_2$ absorption tower at a position on the downstream side of the packing in a flow direction of the combustion exhaust gas toward the combustion exhaust gas outlet port from the combustion exhaust gas inlet port to bring the liquid into contact with the combustion exhaust gas, recovering the liquid brought into contact with the combustion exhaust gas, and cooling the recovered liquid, is provided.

According to a third aspect of the present invention, an amine compound-containing absorption liquid-regenerating apparatus, comprising: a $CO_2$ desorption tower for desorbing $CO_2$ contained in an amine compound-containing absorption liquid from the amine compound-containing absorption liquid; and at least one heater selected from the group consisting of a first heater for heating the amine compound-containing absorption liquid, and a second heater for heating the amine compound-containing absorption liquid to generate steam, the $CO_2$ desorption tower being provided with an absorption liquid inlet port for introducing the amine compound-containing absorption liquid into the $CO_2$ desorption tower, an absorption liquid outlet port for discharging the amine compound-containing absorption liquid from the $CO_2$ desorption tower, a steam inlet port for introducing the steam into the $CO_2$ desorption tower, a $CO_2$ outlet port for discharging the $CO_2$ from the $CO_2$ desorption tower, and a packing that is a static-type mixer having a spiral porous blade, in which the packing is arranged between the absorption liquid inlet port and the absorption liquid outlet port and between the steam inlet port and the $CO_2$ outlet port, the first heater being provided with an absorption liquid recovery port for recovering the amine compound-containing absorption liquid from the $CO_2$ desorption tower, and an absorption liquid supply port for supplying the amine compound-containing absorption liquid to the $CO_2$ desorption tower, in which the absorption liquid recovery port and the absorption liquid supply port are connected to the $CO_2$ desorption tower at a position on the downstream side of the packing in a flow direction of the amine compound-containing absorption liquid toward the absorption liquid outlet port from the absorption liquid inlet port, and the second heater being provided with an absorption liquid recovery port for recovering the amine compound-containing absorption liquid from the $CO_2$ desorption tower, and a steam supply port for supplying the steam to the $CO_2$ desorption tower, in which the absorption liquid recovery port is connected to the $CO_2$ desorption tower at a position on the downstream side of the packing in the flow direction of the amine compound-containing absorption liquid, and the steam supply port is connected to the steam inlet port of the $CO_2$ desorption tower, is provided.

According to a fourth aspect of the present invention, in the third aspect of the present invention, the amine compound-containing absorption liquid-regenerating apparatus, further comprising a gas-liquid separator for separating the $CO_2$ discharged together with the steam from the $CO_2$ outlet port of the $CO_2$ desorption tower into gas and liquid, in which the gas-liquid separator is provided with a $CO_2$ inlet port for introducing the $CO_2$ discharged together with the steam into the gas-liquid separator, a $CO_2$ recovery port for recovering the $CO_2$ obtained by gas-liquid separation, and a liquid outlet port for discharging the liquid obtained by gas-liquid separation, the $CO_2$ inlet port is connected to the $CO_2$ outlet port of the $CO_2$ desorption tower, and the liquid outlet port is connected to the absorption liquid inlet port of the $CO_2$ desorption tower, is provided.

According to a fifth aspect of the present invention, in the third or fourth aspect of the present invention, the amine compound-containing absorption liquid-regenerating apparatus, in which a heat source of the second heater is steam, in which the apparatus further comprises a superheated steam prevention device for reducing temperature and pressure of the steam to be supplied to the second heater as the heat source of the second heater, in which the superheated steam prevention device is connected to the second heater, is provided.

According to a sixth aspect of the present invention, a method for regenerating an amine compound-containing absorption liquid, comprising:

a first step of desorbing $CO_2$ from an amine compound-containing absorption liquid containing the $CO_2$ by bringing the amine compound-containing absorption liquid into countercurrent contact with steam in a packing to regenerate the amine compound-containing absorption liquid and further to recover the $CO_2$, in which the amine compound-containing absorption liquid flows from an absorption liquid inlet port to an absorption liquid outlet port and the steam flows from a steam inlet port to a $CO_2$ outlet port, in a $CO_2$ desorption tower being provided with the absorption liquid inlet port for introducing the amine compound-containing absorption liquid into the $CO_2$ desorption tower, the absorption liquid outlet port for discharging the amine compound-containing absorption liquid from the $CO_2$ desorption tower, the steam inlet port for introducing the steam into the $CO_2$ desorption tower, the $CO_2$ outlet port for discharging the $CO_2$ from the $CO_2$ desorption tower, and the packing that is a static-type mixer having a spiral porous blade; and at least one step selected from the group consisting of a second step of recovering a part of the amine compound-containing absorption liquid from the $CO_2$ desorption tower at a position on the downstream side of the packing in a flow direction of the amine compound-containing absorption liquid toward the absorption liquid outlet port from the absorption liquid inlet port, heating the recovered amine compound-containing absorption liquid, and supplying the heated amine compound-containing absorption liquid to the $CO_2$ desorption tower at a position on the downstream side of the packing in the flow direction of the amine compound-containing absorption liquid, and a third step of recovering a part of the amine compound-containing absorption liquid from the $CO_2$ desorption tower at a position on the downstream side of the packing in the flow direction of the amine compound-containing absorption liquid, heating the recovered amine compound-containing absorption liquid to generate steam, and supplying the steam to the $CO_2$ desorption tower from the steam inlet port, is provided.

According to a seventh aspect of the present invention, in the sixth aspect of the present invention, the method for regenerating an amine compound-containing absorption liquid, further comprising a fourth step of separating the $CO_2$ discharged together with the steam from the $CO_2$ outlet port into gas and liquid, recovering the separated $CO_2$, and supplying the separated liquid to the $CO_2$ desorption tower through the absorption liquid inlet port, is provided.

According to an eighth aspect of the present invention, in the sixth or seventh aspect of the present invention, the method for regenerating an amine compound-containing absorption liquid, in which heating of the amine compound-containing absorption liquid is performed by heat exchange with the steam in the third step, in which the method further comprises a fifth step of reducing temperature and pressure of the steam to be used for heat exchange before performing the heat exchange in the third step, is provided.

According to a ninth aspect of the present invention, an amine compound-containing absorption liquid-purifying apparatus, comprising: an evaporation tank for evaporating and separating impurities contained in an amine compound-containing absorption liquid from the amine compound-containing absorption liquid, the evaporation tank being provided with a heating jacket arranged on the outside of the evaporation tank; a superheated steam prevention device for reducing temperature and pressure of steam to be supplied as a heat source to the heating jacket; a gas-liquid separator for recovering the amine compound-containing absorption liquid evaporated and separated from the impurities; and a decompression device for reducing pressure in the evaporation tank, the evaporation tank being provided with an absorption liquid inlet port for introducing the amine compound-containing absorption liquid into the evaporation tank, an absorption liquid outlet port for discharging the amine compound-containing absorption liquid evaporated and separated from the impurities from the evaporation tank, and an impurity outlet port for discharging the impurities evaporated and separated from the amine compound-containing absorption liquid from the evaporation tank, the gas-liquid separator being provided with an absorption liquid inlet port for introducing the amine compound-containing absorption liquid evaporated and separated from the impurities into the gas-liquid separator, a gas outlet port for discharging gas obtained by gas-liquid separation, and a liquid outlet port for discharging liquid obtained by gas-liquid separation, the decompression device being connected to the evaporation tank through the absorption liquid inlet port of the gas-liquid separator, the gas outlet port of the gas-liquid separator, and the absorption liquid outlet port of the evaporation tank, and the superheated steam prevention device being connected to the heating jacket, is provided.

According to a tenth aspect of the present invention, a method for purifying an amine compound-containing absorption liquid, comprising:

a first step of purifying an amine compound-containing absorption liquid containing impurities by continuously or intermittently introducing the amine compound-containing absorption liquid into an evaporation tank under vacuum decompression, and by evaporating and separating the amine compound-containing absorption liquid into the impurities and a purified amine compound-containing absorption liquid;

a second step of supplying steam to a heating jacket arranged on the outside of the evaporation tank to heat the evaporation tank; and a third step of reducing temperature and pressure of the steam before supplying the steam to the heating jacket in the second step, is provided.

According to an eleventh aspect of the present invention, a combustion exhaust gas-pretreating apparatus, comprising a pretreatment tower for performing desulfurization, dust removal, and cooling on a combustion exhaust gas, the pretreatment tower being provided with a combustion exhaust gas inlet port for introducing the combustion exhaust gas into the pretreatment tower, a combustion exhaust gas outlet port for discharging the combustion exhaust gas from the pretreatment tower, a desulfurization liquid inlet port for introducing a desulfurization liquid into the pretreatment tower, a desulfurization liquid outlet port for discharging the desulfurization liquid from the pretreatment tower, and a packing that is a static-type mixer having a spiral porous blade, in which the packing is arranged between the combustion exhaust gas inlet port and the combustion exhaust gas outlet port and between the desulfurization liquid inlet port and the desulfurization liquid outlet port, and the combustion exhaust gas inlet port being arranged on the upstream side of the packing in a flow direction of the desulfurization liquid toward the desulfurization liquid outlet port from the desulfurization liquid inlet port, and the desulfurization liquid inlet port being arranged on the upstream side of the packing in a flow direction of the combustion exhaust gas toward the combustion exhaust gas outlet port from the combustion exhaust gas inlet port, is provided.

According to a twelfth aspect of the present invention, in the eleventh aspect of the present invention, the combustion exhaust gas-pretreating apparatus, further comprising a cooler for cooling the desulfurization liquid, in which the cooler is provided with a desulfurization liquid recovery port for recovering the desulfurization liquid from the pretreatment tower, and a desulfurization liquid supply port for supplying the desulfurization liquid to the pretreatment tower, the desulfurization liquid recovery port is connected to the desulfurization liquid outlet port, and the desulfurization liquid supply port is connected to the desulfurization liquid inlet port, is provided.

According to a thirteenth aspect of the present invention, in the twelfth aspect of the present invention, the combustion exhaust gas-pretreating apparatus, further comprising a mixer for mixing the desulfurization liquid cooled by the cooler with a replenishing liquid, in which the mixer is provided with a replenishing liquid inlet port for introducing the replenishing liquid into the mixer, a desulfurization liquid inlet port for introducing the cooled desulfurization liquid into the mixer, and a mixed liquid outlet port for discharging a mixed liquid from the mixer, in which the desulfurization liquid inlet port of the mixer is connected to the desulfurization liquid supply port of the cooler, and the mixed liquid outlet port of the mixer is connected to the desulfurization liquid inlet port of the pretreatment tower, is provided.

According to a fourteenth aspect of the present invention, a method for pretreating a combustion exhaust gas, comprising a first step of bringing a combustion exhaust gas into concurrent contact with a desulfurization liquid in a packing to perform desulfurization, dust removal, and cooling on the combustion exhaust gas, in which the combustion exhaust gas flows from a combustion exhaust gas inlet port to a combustion exhaust gas outlet port and the desulfurization liquid flows from a desulfurization liquid inlet port to a desulfurization liquid outlet port, in a pretreatment tower being provided with the combustion exhaust gas inlet port for introducing the combustion exhaust gas into the pretreatment tower, the combustion exhaust gas outlet port for discharging the combustion exhaust gas from the pretreatment tower, the desulfurization liquid inlet port for introducing the desulfurization liquid into the pretreatment tower, the desulfurization liquid outlet port for discharging the desulfurization liquid from the pretreatment tower, and the packing that is a static-type mixer having a spiral porous blade, is provided.

According to a fifteenth aspect of the present invention, in the fourteenth aspect of the present invention, the method for pretreating a combustion exhaust gas, further comprising a second step of recovering the desulfurization liquid from the pretreatment tower at a position on the downstream side of the packing in a flow direction of the desulfurization liquid toward the desulfurization liquid outlet port from the desulfurization liquid inlet port, cooling the recovered desulfurization liquid, and supplying the cooled desulfurization liquid to the pretreatment tower at a position on the upstream side of the packing in the flow direction of the desulfurization liquid, is provided.

According to a sixteenth aspect of the present invention, in the fifteenth aspect of the present invention, the method for pretreating a combustion exhaust gas, in which in the second step, the cooled desulfurization liquid is mixed with a replenishing liquid before the cooled desulfurization liquid is supplied to the pretreatment tower, is provided.

According to a seventeenth aspect of the present invention, a carbon dioxide-recovering apparatus, comprising:

a $CO_2$ absorption tower for reactively absorbing $CO_2$ contained in a combustion exhaust gas into an amine compound-containing absorption liquid, in which the $CO_2$ absorption tower is provided with a combustion exhaust gas inlet port for introducing the combustion exhaust gas into the $CO_2$ absorption tower, a combustion exhaust gas outlet port for discharging the combustion exhaust gas from the $CO_2$ absorption tower, an absorption liquid inlet port for introducing the amine compound-containing absorption liquid into the $CO_2$ absorption tower, an absorption liquid outlet port for discharging the amine compound-containing absorption liquid from the $CO_2$ absorption tower, and a packing that is a static-type mixer having a spiral porous blade, in which the packing is arranged between the combustion exhaust gas inlet port and the combustion exhaust gas outlet port and between the absorption liquid inlet port and the absorption liquid outlet port;

a $CO_2$ desorption tower for desorbing the $CO_2$ contained in the amine compound-containing absorption liquid from the amine compound-containing absorption liquid, in which the $CO_2$ desorption tower is provided with an absorption liquid inlet port for introducing the amine compound-containing absorption liquid into the $CO_2$ desorption tower, an absorption liquid outlet port for discharging the amine compound-containing absorption liquid from the $CO_2$ desorption tower, a steam inlet port for introducing steam into the $CO_2$ desorption tower, a $CO_2$ outlet port for discharging the $CO_2$ from the $CO_2$ desorption tower, and a packing that is a static-type mixer having a spiral porous blade, in which the packing is arranged between the absorption liquid inlet port and the absorption liquid outlet port and between the steam inlet port and the $CO_2$ outlet port;

an evaporation tank for evaporating and separating impurities contained in the amine compound-containing absorption liquid from the amine compound-containing absorption liquid, in which the evaporation tank is provided with an absorption liquid inlet port for introducing the amine compound-containing absorption liquid into the evaporation tank, an absorption liquid outlet port for discharging the amine compound-containing absorption liquid evaporated and separated from the impurities from the evaporation tank, an impurity outlet port for discharging the impurities evaporated and separated from the amine compound-containing absorption liquid from the evaporation tank, and a heating jacket arranged on the outside of the evaporation tank;

a gas-liquid separator for recovering the amine compound-containing absorption liquid evaporated and separated from the impurities in the evaporation tank, in which the gas-liquid separator is provided with an absorption liquid inlet port for introducing the amine compound-containing absorption liquid evaporated and separated from the impurities into the gas-liquid separator, a gas outlet port for discharging a gas obtained by gas-liquid separation, and a liquid outlet port for discharging liquid obtained by gas-liquid separation;

a decompression device for reducing pressure in the evaporation tank, in which the decompression device is connected to the evaporation tank through the absorption liquid inlet port of the gas-liquid separator, the gas outlet port of the gas-liquid separator, and the absorption liquid outlet port of the evaporation tank;

a first heat exchanger for heating the amine compound-containing absorption liquid introduced into the $CO_2$ desorption tower by heat exchange with the amine compound-containing absorption liquid in a flow direction toward the absorption liquid inlet port of the $CO_2$ absorption tower from the absorption liquid outlet port of the $CO_2$ desorption tower, in which the first heater is provided with an absorption liquid recovery port for recovering the amine compound-containing absorption liquid from the $CO_2$ desorption tower, and an absorption liquid supply port for supplying the amine compound-containing absorption liquid to the $CO_2$ desorption tower, in which the absorption liquid recovery port and the absorption liquid supply port are connected to the $CO_2$ desorption tower at a position on the downstream side of the packing in a flow direction of the amine compound-containing absorption liquid toward the absorption liquid outlet port from the absorption liquid inlet port of the $CO_2$ desorption tower; and a second heat exchanger for performing heat exchange of the amine compound-containing absorption liquid flowing toward the absorption liquid inlet port of the $CO_2$ absorption tower from the absorption liquid outlet port of the $CO_2$ desorption tower with the amine compound-containing absorption liquid flowing toward the absorption liquid inlet port of the $CO_2$ desorption tower from the absorption liquid outlet port of the $CO_2$ absorption tower, the absorption liquid outlet port of the $CO_2$ desorption tower being connected to the absorption liquid inlet port of the $CO_2$ absorption tower through the first heat exchanger and the second heat exchanger, and connected to the absorption liquid inlet port of the evaporation tank, the absorption liquid outlet port of the $CO_2$ absorption tower being connected to the absorption liquid inlet port of the $CO_2$ desorption tower through the second heat exchanger, and the liquid outlet port of the gas-liquid separator being connected to the absorption liquid inlet port of the $CO_2$ absorption tower, is provided.

According to an eighteenth aspect of the present invention, in the seventeenth aspect of the present invention, the carbon dioxide-recovering apparatus, further comprising:

a third heat exchanger for generating steam by heating the amine compound-containing absorption liquid introduced into the $CO_2$ desorption tower by heat exchange with steam, in which the third heat exchanger is provided with an absorption liquid recovery port for recovering the amine compound-containing absorption liquid from the $CO_2$ desorption tower, and a steam supply port for supplying the steam to the $CO_2$ desorption tower, in which the absorption liquid recovery port is connected to the $CO_2$ desorption tower at a position on the downstream side of the packing in a flow direction of the amine compound-containing absorption liquid toward the absorption liquid outlet port from the absorption liquid inlet port of the $CO_2$ desorption tower, and the steam supply port is connected to the steam inlet port of the $CO_2$ desorption tower; and a superheated steam prevention device for reducing temperature and pressure of the steam to be supplied as a heat source of the third heat exchanger and the heating jacket of the evaporation tank, in which the superheated steam prevention device is connected to the third heat exchanger and the heating jacket of the evaporation tank, is provided.

According to a nineteenth aspect of the present invention, in the seventeenth or eighteenth aspect of the present invention, the carbon dioxide-recovering apparatus, further comprising a pretreatment tower for performing desulfurization, dust removal, and cooling on the combustion exhaust gas, in which the pretreatment tower is provided with a combustion exhaust gas inlet port for introducing the combustion exhaust gas into the pretreatment tower, a combustion exhaust gas outlet port for discharging the combustion exhaust gas from the pretreatment tower, a desulfurization liquid inlet port for introducing the desulfurization liquid into the pretreatment tower, a desulfurization liquid outlet port for discharging the desulfurization liquid from the pretreatment tower, and a packing that is a static-type mixer having a spiral porous blade, in which the packing is arranged between the combustion exhaust gas inlet port and the combustion exhaust gas outlet port and between the desulfurization liquid inlet port and the desulfurization liquid outlet port, the combustion exhaust gas inlet port is arranged on the upstream side of the packing in a flow direction of the desulfurization liquid toward the desulfurization liquid outlet port from the desulfurization liquid inlet port, and the desulfurization liquid inlet port is arranged on the upstream side of the packing in a flow direction of the combustion exhaust gas toward the combustion exhaust gas outlet port from the combustion exhaust gas inlet port, in which the combustion exhaust gas outlet port of the pretreatment tower is connected to the combustion exhaust gas inlet port of the $CO_2$ absorption tower, is provided.

According to a twentieth aspect of the present invention, a method for recovering carbon dioxide, comprising:

a first step of bringing a combustion exhaust gas containing $CO_2$ into countercurrent or concurrent contact with an amine compound-containing absorption liquid in a packing to reactively absorb the $CO_2$ contained in the combustion exhaust gas into the amine compound-containing absorption liquid, in which the combustion exhaust gas flows from a combustion exhaust gas inlet port to a combustion exhaust gas outlet port and the amine compound-containing absorption liquid flows from an absorption liquid inlet port to an absorption liquid outlet port, in a $CO_2$ absorption tower being provided with the combustion exhaust gas inlet port for introducing the combustion exhaust gas into the $CO_2$ absorption tower, the combustion exhaust gas outlet port for discharging the combustion exhaust gas from the $CO_2$ absorption tower, the absorption liquid inlet port for introducing the amine compound-containing absorption liquid into the $CO_2$ absorption tower, the absorption liquid outlet port for discharging the amine compound-containing absorption liquid from the $CO_2$ absorption tower, and the packing that is a static-type mixer having a spiral porous blade;

a second step of desorbing the $CO_2$ from the amine compound-containing absorption liquid containing the $CO_2$ by bringing the amine compound-containing absorption liquid into countercurrent contact with steam in a packing to regenerate the amine compound-containing absorption liquid and to recover the $CO_2$, in which the amine compound-containing absorption liquid flows from an absorption liquid inlet port to an absorption liquid outlet port and the steam flows from a steam inlet port to a $CO_2$ outlet port, in a $CO_2$ desorption tower being provided with the absorption liquid inlet port for introducing the amine compound-containing absorption liquid into the $CO_2$ desorption tower, the absorption liquid outlet port for discharging the amine compound-containing absorption liquid from the $CO_2$ desorption tower, the steam inlet port for introducing the steam into the $CO_2$ desorption tower, the $CO_2$ outlet port for discharging the $CO_2$ from the $CO_2$ desorption tower, and the packing that is a static-type mixer having a spiral porous blade;

a third step of purifying the amine compound-containing absorption liquid containing impurities by continuously or intermittently introducing the amine compound-containing absorption liquid into an evaporation tank under vacuum decompression, and by evaporating and separating the amine compound-containing absorption liquid into the impurities and a purified amine compound-containing absorption liquid, in the evaporation tank being provided with an absorption liquid inlet port for introducing the amine compound-containing absorption liquid into the evaporation tank, an absorption liquid outlet port for discharging the amine compound-containing absorption liquid evaporated and separated from the impurities from the evaporation tank, an impurity outlet port for discharging the impurities evaporated and separated from the amine compound-containing absorption liquid from the evaporation tank, and a heating jacket arranged on the outside of the evaporation tank;

a fourth step of introducing the amine compound-containing absorption liquid containing the $CO_2$ obtained in the first step into the $CO_2$ desorption tower from the absorption liquid inlet port of the $CO_2$ desorption tower;

a fifth step of introducing the amine compound-containing absorption liquid obtained in the second step in which the $CO_2$ has been removed into the $CO_2$ absorption tower from the absorption liquid inlet port of the $CO_2$ absorption tower;

a sixth step of introducing the amine compound-containing absorption liquid containing the impurities generated in the method for recovering carbon dioxide into the evaporation tank through the absorption liquid inlet port of the evaporation tank from the absorption liquid outlet port of the $CO_2$ desorption tower;

a seventh step of introducing the amine compound-containing absorption liquid obtained in the third step in which the impurities have been removed into the $CO_2$ absorption tower from the absorption liquid inlet port of the $CO_2$ absorption tower;

an eighth step of recovering a part of the amine compound-containing absorption liquid from the $CO_2$ desorption tower at a position on the downstream side of the packing in a flow direction of the amine compound-containing absorption liquid toward the absorption liquid outlet port from the absorption liquid inlet port of the $CO_2$ desorption tower, heating the recovered amine compound-containing absorption liquid by heat exchange with the amine compound-containing absorption liquid flowing toward the absorption liquid inlet port of the $CO_2$ absorption tower in the fifth step, and supplying the heated amine compound-containing absorption liquid to the $CO_2$ desorption tower at a position on the downstream side of the packing in the flow direction of the amine compound-containing absorption liquid; and a ninth step of performing heat exchange of the amine compound-containing absorption liquid flowing toward the absorption liquid inlet port of the $CO_2$ desorption tower in the fourth step with the amine compound-containing absorption liquid flowing toward the absorption liquid inlet port of the $CO_2$ absorption tower in the fifth step, is provided.

According to a twenty-first aspect of the present invention, in the twentieth aspect of the present invention, the method for recovering carbon dioxide, further comprising:

a tenth step of recovering a part of the amine compound-containing absorption liquid from the $CO_2$ desorption tower at a position on the downstream side of the packing in a flow direction of the amine compound-containing absorption liquid toward the absorption liquid outlet port from the absorption liquid inlet port of the $CO_2$ desorption tower, heating the recovered amine compound-containing absorption liquid by heat exchange with steam to generate steam, and supplying the steam to the $CO_2$ desorption tower from the steam inlet port of the $CO_2$ desorption tower;

an eleventh step of supplying the steam to the heating jacket of the evaporation tank to heat the evaporation tank; and a twelfth step of reducing temperature and pressure of the steam to be used as a heat source in the tenth and eleventh steps, is provided.

According to a twenty-second aspect of the present invention, in the twentieth or twenty-first aspect of the present invention, the method for recovering carbon dioxide, further comprising:

a thirteenth step of bringing the combustion exhaust gas into concurrent contact with a desulfurization liquid in a packing to perform desulfurization, dust removal, and cooling on the combustion exhaust gas, in which the combustion exhaust gas flows from a combustion exhaust gas inlet port to a combustion exhaust gas outlet port and the desulfurization liquid flows from a desulfurization liquid inlet port to a desulfurization liquid outlet port, in a pretreatment tower being provided With the combustion exhaust gas inlet port for introducing the combustion exhaust gas into the pretreatment tower, the combustion exhaust gas outlet port for discharging the combustion exhaust gas from the pretreatment tower, the desulfurization liquid inlet port for introducing the desulfurization liquid into the pretreatment tower, the desulfurization liquid outlet port for discharging the desulfurization liquid from the pretreatment tower, and the packing that is a static-type mixer having a spiral porous blade; and a fourteenth step of introducing the combustion exhaust gas obtained in the thirteenth step into the $CO_2$ absorption tower from the absorption liquid inlet port of the $CO_2$ absorption tower, is provided.

Effects of the Invention

According to the carbon dioxide-absorbing apparatus and the method for absorbing carbon dioxide, of the present invention, $CO_2$ contained in a combustion exhaust gas can be efficiently reactively absorbed in an amine compound-containing absorption liquid, and the $CO_2$ can be removed from the combustion exhaust gas.

According to the amine compound-containing absorption liquid-regenerating apparatus and the method for regenerating an amine compound-containing absorption liquid, of the present invention, the energy saving can be realized, and further $CO_2$ can be efficiently desorbed from an amine compound-containing absorption liquid, and the amine compound-containing absorption liquid can be regenerated.

According to the amine compound-containing absorption liquid-purifying apparatus and the method for purifying an amine compound-containing absorption liquid, of the present invention, impurities contained in an amine compound-containing absorption liquid can be efficiently removed, and the amine compound-containing absorption liquid can be purified and the capacity of the amine compound-containing absorption liquid can be restored.

According to the combustion exhaust gas-pretreating apparatus and the method for pretreating a combustion exhaust gas, of the present invention, gas cooling, dust removal, and desulfurization can be efficiently performed on a combustion exhaust gas.

According to the carbon dioxide-recovering apparatus and the method for recovering carbon dioxide, of the present invention, $CO_2$ contained in a combustion exhaust gas can be efficiently recovered.

BRIEF DESCRIPTION OF DRAWINGS

FIG. 11 is view of a Table 2 showing examples of tower miniaturization in a case where a conventional general packing (Raschig rings or the like) is changed to a high-performance packing (MU-SSPW element manufactured by MU Company Ltd.).

MODE FOR CARRYING OUT THE INVENTION

Figure 1:
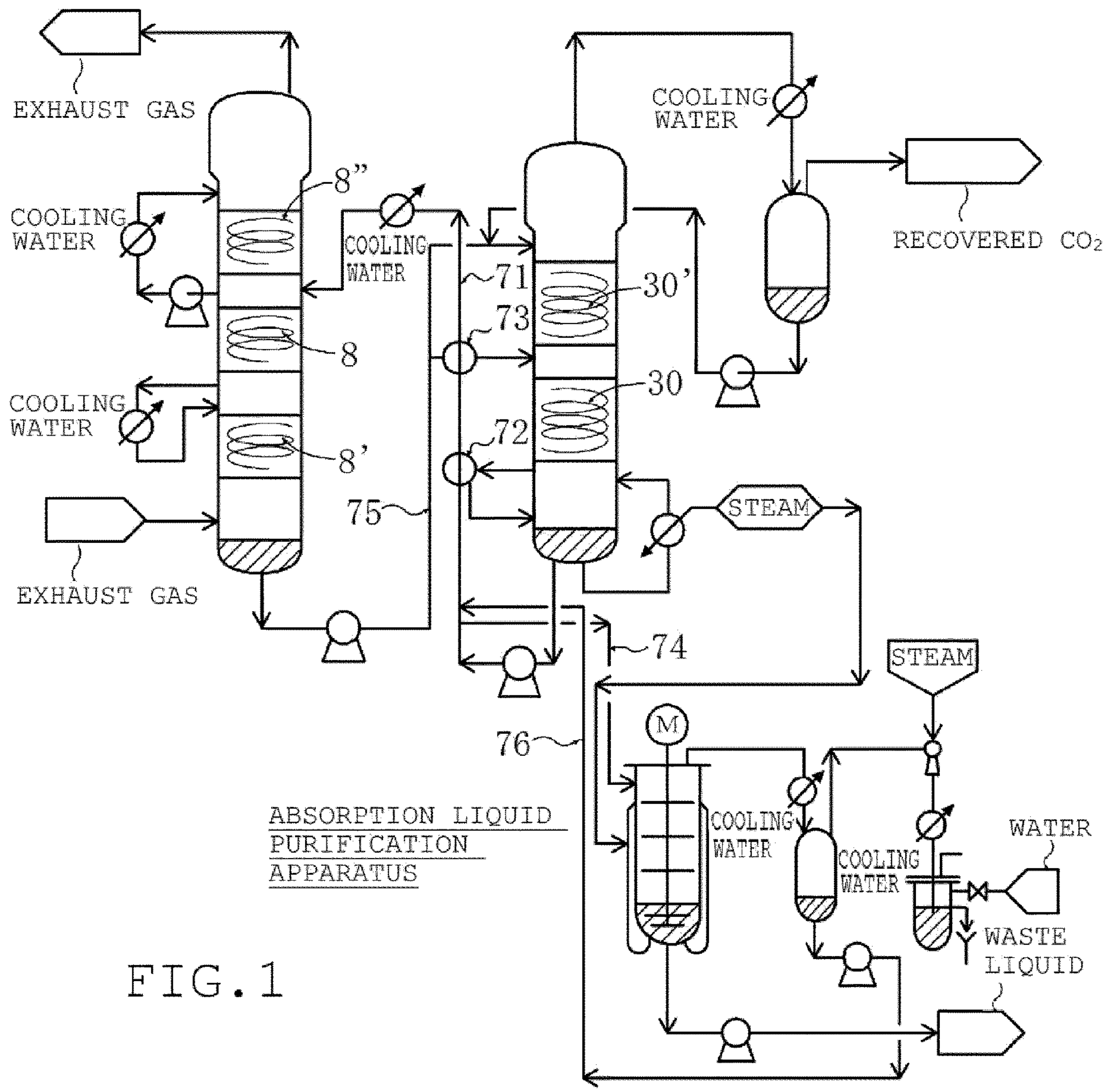
FIG. 1 is a flow diagram schematically showing an embodiment of the method for recovering carbon dioxide according to the present invention utilizing an embodiment of the carbon dioxide-recovering apparatus according to the present invention.

Hereinafter, the present invention will be described in detail while making reference to drawings.

The carbon dioxide-absorbing apparatus according to the present invention is an apparatus for absorbing carbon dioxide being provided with a $CO_2$ absorption tower for reactively absorbing $CO_2$ contained in a combustion exhaust gas into an amine compound-containing absorption liquid, and at least one cooler selected from the group consisting of a first cooler for cooling the amine compound-containing absorption liquid and a second cooler for cooling a liquid different from the amine compound-containing absorption liquid, wherein the $CO_2$ absorption tower is provided with a combustion exhaust gas inlet port for introducing the combustion exhaust gas into the $CO_2$ absorption tower, a combustion exhaust gas outlet port for discharging the combustion exhaust gas from the $CO_2$ absorption tower, an absorption liquid inlet port for introducing the amine compound-containing absorption liquid into the $CO_2$ absorption tower, an absorption liquid outlet port for discharging the amine compound-containing absorption liquid from the $CO_2$ absorption tower, and a packing that is a static-type mixer having a spiral porous blade, wherein the packing is arranged between the combustion exhaust gas inlet port and the combustion exhaust gas outlet port and between the absorption liquid inlet port and the absorption liquid outlet port;

the first cooler is provided with an absorption liquid recovery port for recovering the amine compound-containing absorption liquid from the $CO_2$ absorption tower, and an absorption liquid supply port for supplying the amine compound-containing absorption liquid to the $CO_2$ absorption tower, wherein the absorption liquid recovery port is connected to the $CO_2$ absorption tower at a position on the downstream side of the packing in a flow direction of the amine compound-containing absorption liquid toward the absorption liquid outlet port from the absorption liquid inlet port, and the absorption liquid supply port is connected to the $CO_2$ absorption tower at a position on the upstream side of the packing in the flow direction of the amine compound-containing absorption liquid; and the second cooler is provided with a liquid supply port for supplying the liquid to be brought into contact with the combustion exhaust gas to the $CO_2$ absorption tower, and a liquid recovery port for recovering the liquid brought into contact with the combustion exhaust gas from the $CO_2$ absorption tower, wherein the liquid supply port and the liquid recovery port are connected to the $CO_2$ absorption tower at a position on the downstream side of the packing in a flow direction of the combustion exhaust gas toward the combustion exhaust gas outlet port from the combustion exhaust gas inlet port.

In the carbon dioxide-absorbing apparatus according to the present invention, by providing a packing that is a static-type mixer having a spiral porous blade, which is arranged between the combustion exhaust gas inlet port and the combustion exhaust gas outlet port and between the absorption liquid inlet port and the absorption liquid outlet port, inside the $CO_2$ absorption tower, the $CO_2$ contained in a combustion exhaust gas can be efficiently reactively absorbed in an amine compound-containing absorption liquid by bringing the combustion exhaust gas into counter-current or concurrent contact with the amine compound-containing absorption liquid in the packing. In this regard, in the carbon dioxide-absorbing apparatus according to the present invention, the number of the packings to be arranged in the $CO_2$ absorption tower is not particularly limited, and may be one, or two or more.

In the carbon dioxide-absorbing apparatus according to the present invention, as the packing being a static-type mixer having a spiral porous blade, a high-performance packing as described in U.S. Pat. No. 7,510,172 can be adopted. By using such a high-performance packing, $CO_2$ contained in a combustion exhaust gas can be efficiently reactively absorbed in a carbon dioxide-containing absorption liquid, and the $CO_2$ can be removed from the combustion exhaust gas.

Further, by using the high-performance packing as a packing, it has been proved that the high-performance packing is significantly effective in the energy saving, the miniaturization of the facility, the improvement of the safety, and the reduction of the maintenance costs. The packing has an excellent feature that is to have a self-cleaning action with which a liquid itself cleans the packing, is maintenance-free, and can reduce the differential pressure and the size, and the packing has many achievements. In addition, by the miniaturization of the tower, the $CO_2$ absorption tower and the $CO_2$ desorption tower can be made vertically into a single unit so as to be compact in size.

In the present specification, the expression "static-type mixer having a spiral porous blade" means a static-type mixer capable of mixing fluids with no power, which has a right-twisted and/or left-twisted spiral blade body, and the blade body is formed of a porous body or a porous material. In this regard, the "static-type mixer having a spiral porous blade" described here is also applicable to a packing filled each inside of a $CO_2$ desorption tower and a pretreatment tower, which are used in each of the carbon dioxide-absorbing apparatus, the method for absorbing carbon dioxide, the amine compound-containing absorption liquid-regenerating apparatus, the method for regenerating an amine compound-containing absorption liquid, the combustion exhaust gas-pretreating apparatus, the method for pretreating a combustion exhaust gas, the carbon dioxide-recovering apparatus, and the method for recovering carbon dioxide, these apparatuses and methods are described later.

As a preferred static-type mixer having a spiral porous blade, a static-type mixer obtained by arranging a cylindrical passage pipe through which a fluid flows, providing a right-rotation or left-rotation spiral first blade body inside the passage pipe, arranging a first inner cylindrical pipe in an axial center part of the first blade body, providing a right-rotation or left-rotation spiral second blade body inside the first inner cylindrical pipe, and arranging a second inner cylindrical pipe in an axial center part of the second blade body, in which the first blade body and the second blade body are each formed of a porous body or a porous material, is mentioned.

Figure 8:
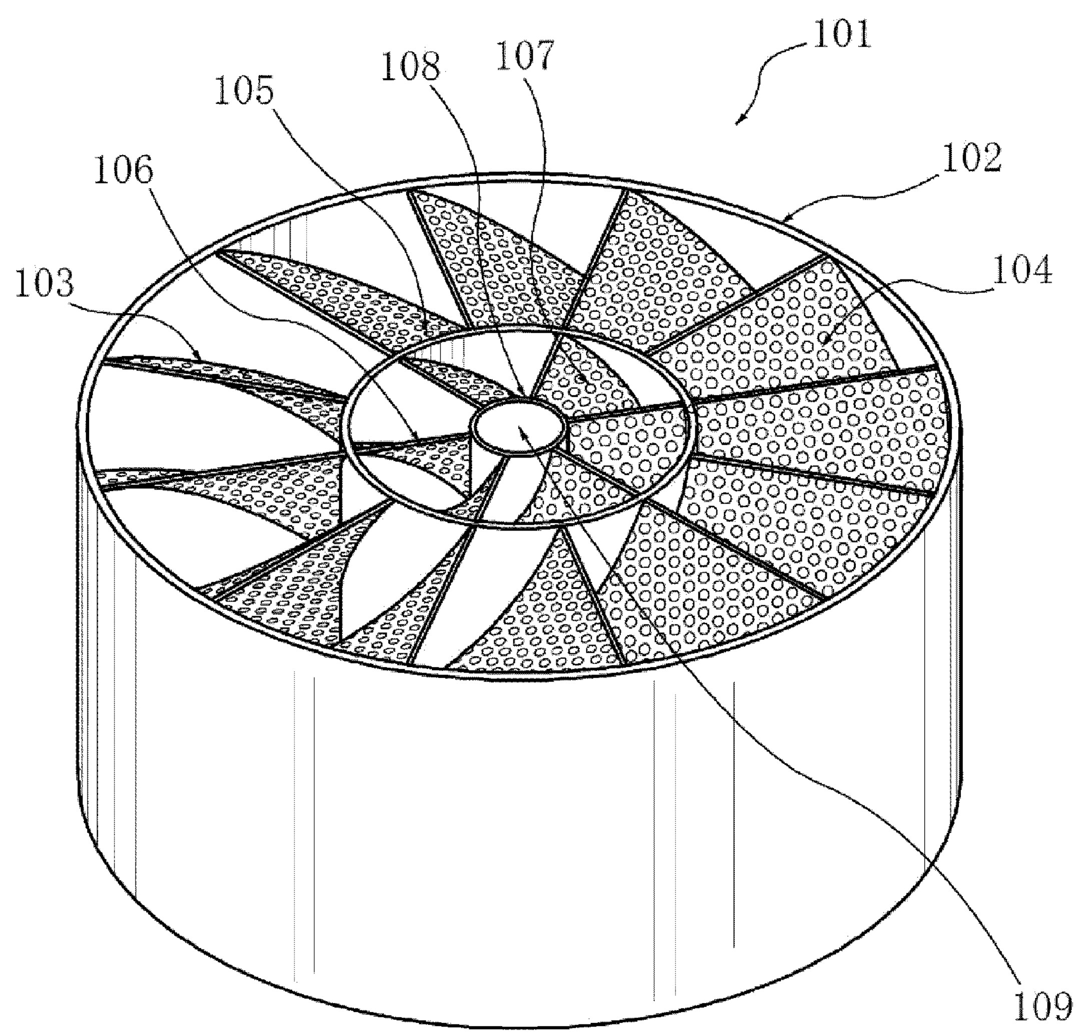
FIG. 8 is a perspective view showing an embodiment of a static-type mixer having a spiral porous blade, which is a packing used in each of the carbon dioxide-absorbing apparatus, the method for absorbing carbon dioxide, the amine compound-containing absorption liquid-regenerating apparatus, the method for regenerating an amine compound-containing absorption liquid, the combustion exhaust gas-pretreating apparatus, the method for pretreating a combustion exhaust gas, the carbon dioxide-recovering apparatus, and the method for recovering carbon dioxide, according to the present invention.
Figure 9:
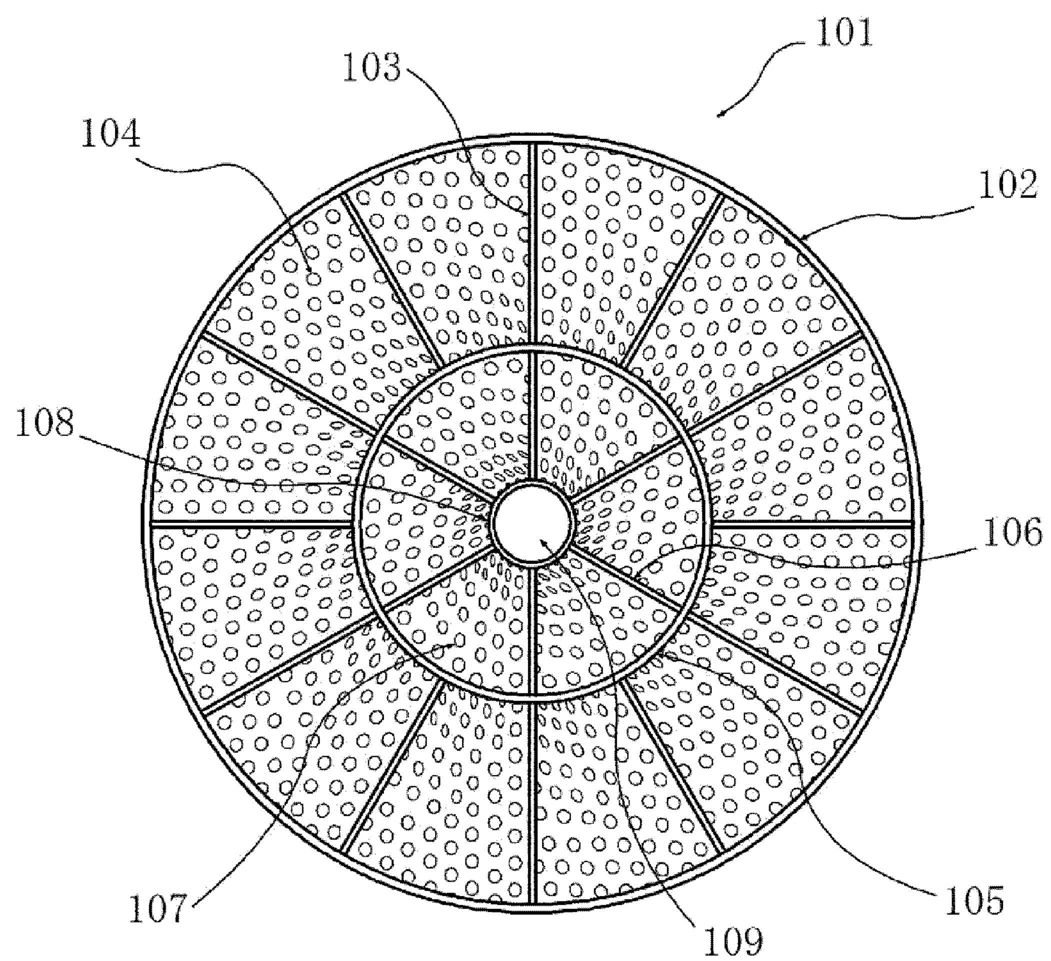
FIG. 9 is a bottom view of the static-type mixer having a spiral porous blade shown in FIG. 8.

Although a static-type mixer having a spiral porous blade has been described in detail in U.S. Pat. No. 7,510,172, suitable examples of the static-type mixer having a spiral porous blade will be described also in the present specification below with reference to drawings. FIG. 8 shows a perspective view of an example of a static-type mixer having a spiral-shaped porous blade, and FIG. 9 shows a bottom view of the static-type mixer having a spiral porous blade shown in FIG. 8.

The static-type mixer having a spiral porous blade shown in FIG. 8 is a 90° right rotation-type (clockwise) static-type mixer 101. The static-type mixer 101 has a cylindrical passage pipe 102, and multiple spiral right rotation-type first blade bodies 103 provided inside the passage pipe 102. The first blade bodies 103 are each formed of a porous body having a large number of bored holes 104. A cylindrical first inner cylindrical pipe 105 is arranged in the inner side of these first blade bodies 103. The first inner cylindrical pipe 105 is arranged only by a length required in a connection part of the first blade bodies 103 in the axial direction (longitudinal direction), and is not arranged in other places. Multiple spiral right rotation-type second blade bodies 106 are provided inside the first inner cylindrical pipe 105, and the blade bodies 106 are each formed of a porous body having a large number of bored holes 107. A cylindrical second inner cylindrical pipe 108 is arranged in the inner side of these second blade bodies 106 to form an opening part 109. The second inner cylindrical pipe 108 is arranged for increasing the mechanical strength against the torsional stress of the second blade bodies 106. The second inner cylindrical pipe 108 is arranged only by a length required in a connection part of the second blade bodies 106 as needed, and is not arranged in other places. One end of each of the first blade bodies 103 is connected to the outer peripheral surface of the first inner cylindrical pipe 105, each of the first blade bodies 103 is spirally twisted in the clockwise direction (right rotation) toward the inner peripheral surface of the passage pipe 102, and the other end part is connected to the inner peripheral surface of the passage pipe 102.

In a similar manner, one end of each of the second blade bodies 106 is connected to the outer peripheral surface of the second inner cylindrical pipe 108, each of the second blade bodies 106 is spirally twisted in the clockwise direction (right rotation) toward the inner peripheral surface of the first inner cylindrical pipe 105, and the other end part is connected to the inner peripheral surface of the first inner cylindrical pipe 105. Since the second inner cylindrical pipe 108 has an opening at the central part, the second blade bodies 106 are not present in the axial center part of the second inner cylindrical pipe 108, and this part is missing. In this way, as shown in FIGS. 8 and 9, an opening part 109 which has no blade is formed in the axial center part of the second inner cylindrical pipe 108.

The rotation angle (torsional angle) of the blade bodies 103 and 106 is not limited to 90°, and is in the range of preferably around 5° to 270° depending on the inner diameter of the static-type mixer 101, and more preferably around 10° to 180°. Further, inner cylindrical pipes can be used by appropriately increasing or decreasing the number of the inner cylindrical pipes to be arranged by at least one or more depending on the inner diameter of the static-type mixer 101 so that the diameter of the opening part 102 can be a minimum diameter, for example, 50 mm or less, as the third, the fourth, the fifth, and the n-th inner cylindrical pipes. In a similar manner, blade bodies can also be appropriately used. In addition, blade bodies 103 and 106 can be used by appropriately increasing or decreasing the number of the blade bodies 103 and 106 to be provided without being limited to 12 bodies and 6 bodies, respectively.

In the present specification, the expression "amine compound-containing absorption liquid" means a liquid that can absorb $CO_2$ contained in a combustion exhaust gas by being brought into contact with the combustion exhaust gas, and is made of an aqueous solution of an amine compound. The aqueous solution of an amine compound to be used in the present invention is not particularly limited as long as it absorbs $CO_2$ in a state of an aqueous solution and can be regenerated by heating, and as specific examples of the amine compound, alkanol amines such as monoethanolamine (MEA), diethanolamine (DEA), triethanolamine (TEA), methyldiethanolamine (MDEA), diisopropanolamine (DIPA), methylamino propylamine (MAPA), piperazine, diethylethanolamine (DEEA), methyldiisopropanolamine (MDIPA), dimethylaminopropanol (DIMAP), and 2-amino-1-butanol (2-AB); hindered amines each having an alcoholic hydroxyl group; and diamines can be mentioned. These amine compounds are each used alone, and further may be mixed for use. The total amine content in an aqueous solution of the amine compound is usually 10 to 65% by weight.

In the present specification, the expression "combustion exhaust gas" means a combustion gas discharged from a combustion device such as a boiler, which uses a fossil resource containing carbon such as coal or heavy oil or a biological resource such as woods, crops, or grass.

The carbon dioxide-absorbing apparatus according to the present invention is provided with at least one cooler selected from the group consisting of a first cooler for cooling an amine compound-containing absorption liquid and a second cooler for cooling a liquid different from the amine compound-containing absorption liquid.

In the carbon dioxide-absorbing apparatus according to the present invention, the first cooler can be suitably used to prevent the heat generation of the compound-containing absorption liquid due to reactive absorption, and the cooled amine compound-containing absorption liquid can be reused. In this regard, in a case where the $CO_2$ absorption tower is provided with multiple packings, the absorption liquid recovery port of the first cooler has only to be connected to the $CO_2$ absorption tower at a position on the downstream side of at least one of the packings in a flow direction of the amine compound-containing absorption liquid toward the absorption liquid outlet port from the absorption liquid inlet port of the $CO_2$ absorption tower, and the absorption liquid supply port of the first cooler has only to be connected to the $CO_2$ absorption tower at a position on the upstream side of at least one of the packings in the flow direction of the amine compound-containing absorption liquid. In this regard, the absorption liquid to be cooled by the first cooler is an amine compound-containing absorption liquid introduced into the $CO_2$ absorption tower in order to reactively absorb the $CO_2$ contained in a combustion exhaust gas.

In the carbon dioxide-absorbing apparatus according to the present invention, the second cooler can be suitably used to prevent the entrainment in a combustion exhaust gas, and can cool liquid (circulating liquid) whose temperature has risen by bringing the liquid into contact with a combustion exhaust gas to recycle the liquid. From the viewpoint of preventing the entrainment in a combustion exhaust gas, the liquid supply port of the second cooler is preferably provided in the vicinity of a combustion exhaust gas outlet port of a $CO_2$ absorption tower. In this regard, in a case of bringing the combustion exhaust gas into countercurrent contact with the circulating liquid, the liquid recovery port of the second cooler is preferably connected to the $CO_2$ absorption tower at a position on the upstream side of the position where the liquid supply port of the second cooler has been connected in a flow direction of the combustion exhaust gas toward the combustion exhaust gas outlet port from the combustion exhaust gas inlet port of the $CO_2$ absorption tower, and in a case of bringing the combustion exhaust gas into concurrent contact with the circulating liquid, the liquid recovery port of the second cooler is preferably connected to the $CO_2$ absorption tower at a position on the downstream side of the position where the liquid supply port of the second cooler has been connected in the flow direction of the combustion exhaust gas. Further, the $CO_2$ absorption tower is preferably provided with an additional packing between the position where the liquid supply port of the second cooler has been connected and the position where the liquid recovery port of the second cooler has been connected. The additional packing is preferably arranged at a position closest to the combustion exhaust gas outlet port among the packings in the $CO_2$ absorption tower. As the additional packing, the above-described static-type mixer having a spiral porous blade can be suitably used. In this regard, as the liquid (circulating liquid) to be cooled by the second cooler, it is not required to be an amine compound-containing absorption liquid, and water or the like can be used, and since the liquid brought into contact with a combustion exhaust gas is cyclic recycled, the liquid contains a small amount of amine compound.

The method for absorbing carbon dioxide according to the present invention comprises:

a first step of bringing a combustion exhaust gas containing $CO_2$ into countercurrent or concurrent contact with an amine compound-containing absorption liquid in a packing to reactively absorb the $CO_2$ contained in the combustion exhaust gas into the amine compound-containing absorption liquid, in which the combustion exhaust gas flows from a combustion exhaust gas inlet port to a combustion exhaust gas outlet port and the amine compound-containing absorption liquid flows from an absorption liquid inlet port to an absorption liquid outlet port, in a $CO_2$ absorption tower being provided with the combustion exhaust gas inlet port for introducing the combustion exhaust gas into the $CO_2$ absorption tower, the combustion exhaust gas outlet port for discharging the combustion exhaust gas from the $CO_2$ absorption tower, the absorption liquid inlet port for introducing the amine compound-containing absorption liquid into the $CO_2$ absorption tower, the absorption liquid outlet port for discharging the amine compound-containing absorption liquid from the $CO_2$ absorption tower, and the packing that is a static-type mixer having a spiral porous blade; and at least one step selected from the group consisting of a second step of recovering a part of the amine compound-containing absorption liquid from the $CO_2$ absorption tower at a position on the downstream side of the packing in a flow direction of the amine compound-containing absorption liquid toward the absorption liquid outlet port from the absorption liquid inlet port, cooling the recovered amine compound-containing absorption liquid, and supplying the cooled amine compound-containing absorption liquid to the $CO_2$ absorption tower at a position on the upstream side of the packing in the flow direction of the amine compound-containing absorption liquid, and a third step of supplying a liquid to the $CO_2$ absorption tower at a position on the downstream side of the packing in a flow direction of the combustion exhaust gas toward the combustion exhaust gas outlet port from the combustion exhaust gas inlet port to bring the liquid into contact with the combustion exhaust gas, recovering the liquid brought into contact with the combustion exhaust gas, and cooling the recovered liquid.

The method for absorbing carbon dioxide according to the present invention can be performed by utilizing the above-described carbon dioxide-absorbing apparatus according to the present invention. Specifically, the method for absorbing carbon dioxide can be performed by utilizing the $CO_2$ absorption tower in the first step, by utilizing the first cooler in the second step, and by utilizing the second cooler in the third step.

Next, embodiments of the carbon dioxide-absorbing apparatus according to the present invention and the method for absorbing carbon dioxide according to the present invention will be described with reference to FIGS. 3 and 4. Both of FIGS. 3 and 4 are control flow diagrams each schematically showing an embodiment of the method for absorbing carbon dioxide according to the present invention utilizing an embodiment of the carbon dioxide-absorbing apparatus according to the present invention, in an embodiment of the method for recovering carbon dioxide according to the present invention, FIG. 3 is a detail in a case where the $CO_2$ absorption tower is in countercurrent operation, and FIG. 4 is a detail in a case where the $CO_2$ absorption tower is in concurrent operation.

Figure 3:
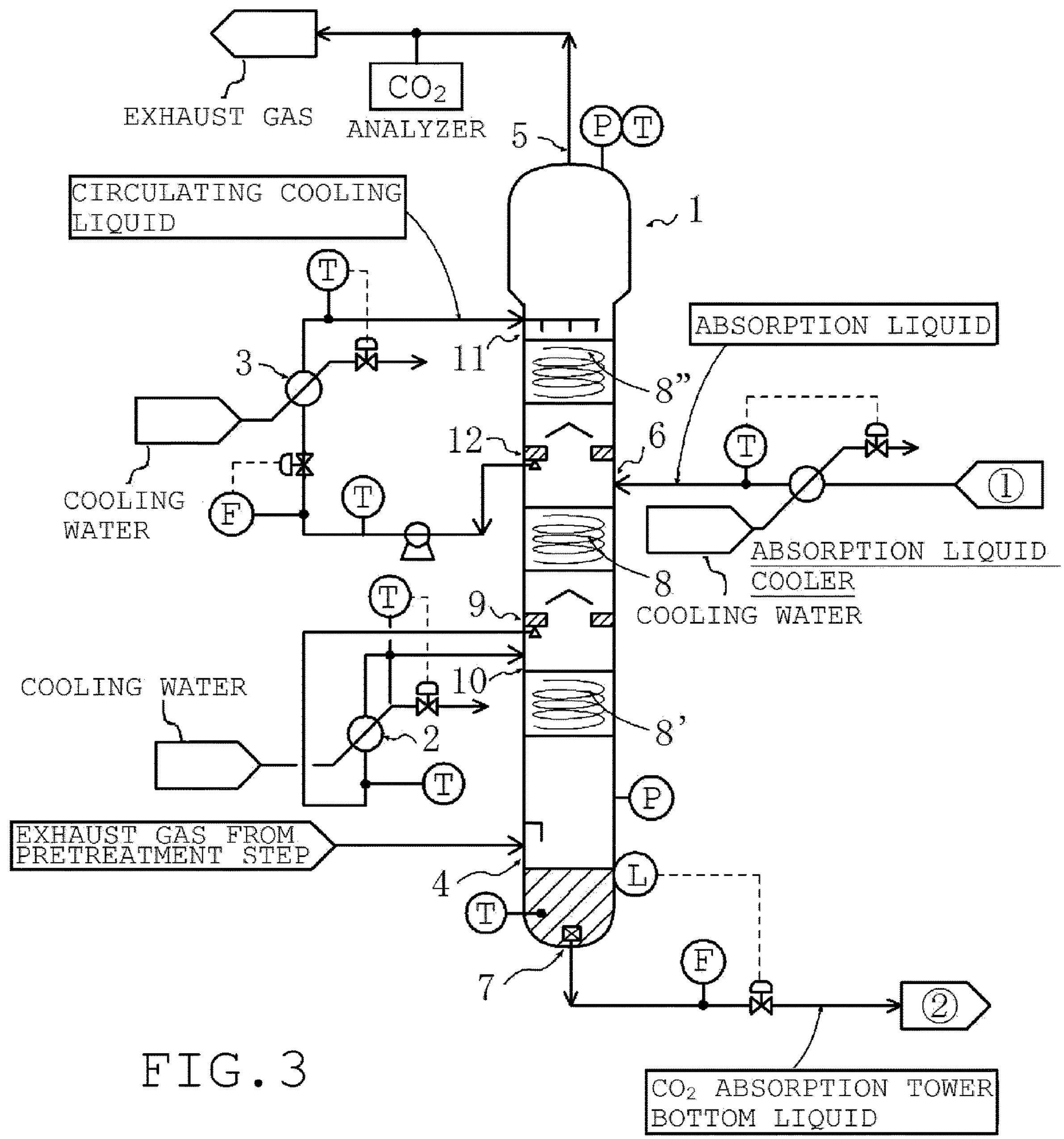
FIG. 3 is a control flow diagram schematically showing an embodiment of the method for absorbing carbon dioxide according to the present invention utilizing an embodiment of the carbon dioxide-absorbing apparatus according to the present invention, in an embodiment of the method for recovering carbon dioxide according to the present invention. The number 1 enclosed in a circle in FIG. 3 indicates the flow of the amine compound-containing absorption liquid supplied from the number 1 enclosed in a circle in FIG. 5, and the number 2 enclosed in a circle in FIG. 3 indicates the flow of the amine compound-containing absorption liquid to be supplied to the number 2 enclosed in a circle in FIG. 5.
Figure 4:
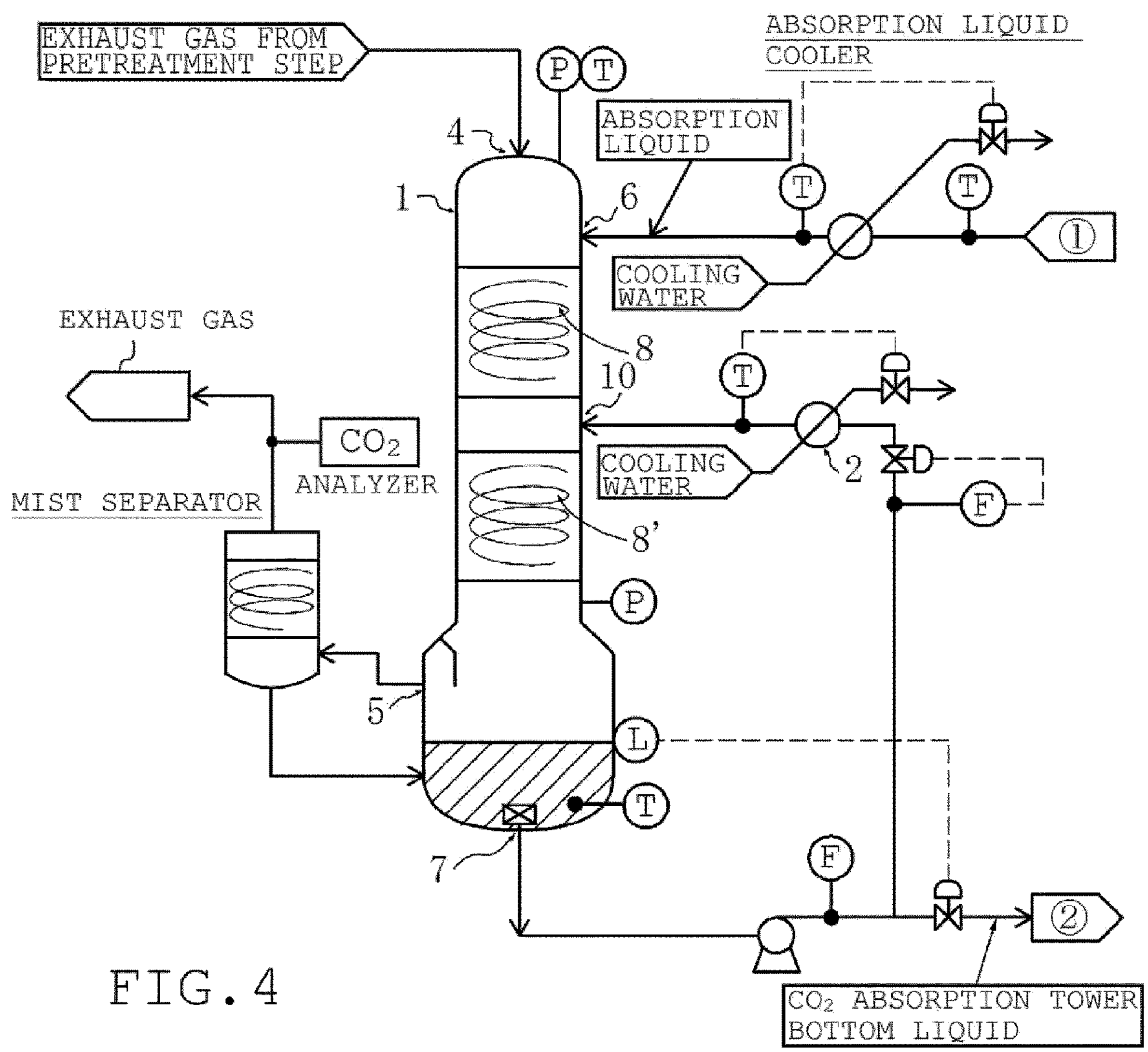
FIG. 4 is a control flow diagram schematically showing an embodiment of the method for absorbing carbon dioxide according to the present invention utilizing an embodiment of the carbon dioxide-absorbing apparatus according to the present invention, in an embodiment of the method for recovering carbon dioxide according to the present invention. The number 1 enclosed in a circle in FIG. 4 indicates the flow of the amine compound-containing absorption liquid supplied from the number 1 enclosed in a circle in FIG. 5, and the number 2 enclosed in a circle in FIG. 4 indicates the flow of the amine compound-containing absorption liquid to be supplied to the number 2 enclosed in a circle in FIG. 5.

The carbon dioxide-absorbing apparatus shown in FIG. 3 is provided with a $CO_2$ absorption tower 1, a first cooler 2, and a second cooler 3.

The $CO_2$ absorption tower 1 shown in FIG. 3 is provided with a combustion exhaust gas inlet port 4, a combustion exhaust gas outlet port 5, an absorption liquid inlet port 6, an absorption liquid outlet port 7, and two packings 8, and 8' each being a static-type mixer having a spiral porous blade. In this regard, the packings 8, and 8' are arranged between the combustion exhaust gas inlet port 4 and the combustion exhaust gas outlet port 5 and between the absorption liquid inlet port 6 and the absorption liquid outlet port 7. The combustion exhaust gas introduced into the $CO_2$ absorption tower 1 flows from the combustion exhaust gas inlet port 4 toward the combustion exhaust gas outlet port 5, and the amine compound-containing absorption liquid introduced into the $CO_2$ absorption tower 1 flows from the absorption liquid inlet port 6 toward the absorption liquid outlet port 7. In FIG. 3, the $CO_2$ contained in a combustion exhaust gas can be efficiently reactively absorbed in an amine compound-containing absorption liquid by bringing the amine compound-containing absorption liquid into countercurrent contact with the combustion exhaust gas in the packings 8 and 8'. In this regard, the number of the packings to be arranged in the $CO_2$ absorption tower is not particularly limited.

In the first cooler 2 shown in FIG. 3, an absorption liquid recovery port for recovering an amine compound-containing absorption liquid from the $CO_2$ absorption tower is connected to the $CO_2$ absorption tower 1 at a position 9 on the downstream side of the packing 8 in a flow direction of the amine compound-containing absorption liquid toward the absorption liquid outlet port from the absorption liquid inlet port, through a flow path, and an absorption liquid supply port for supplying an amine compound-containing absorption liquid to the $CO_2$ absorption tower is connected to the $CO_2$ absorption tower 1 at a position 10 on the upstream side of the packing 8' in the flow direction of the amine compound-containing absorption liquid, through a flow path. The first cooler 2 is a heat exchanger, and can cool an amine compound-containing absorption liquid by heat exchange with cooling water. As a means for cooling the amine compound-containing absorption liquid from the $CO_2$ absorption tower in the first cooler 2, for example, a typical technique such as a bowl type liquid collector or a chimney tray can be used.

In the second cooler 3 shown in FIG. 3, a liquid supply port for supplying liquid to be brought into contact with a combustion exhaust gas to the $CO_2$ absorption tower and a liquid recovery port for recovering liquid brought into contact with a combustion exhaust gas from the $CO_2$ absorption tower are connected to the $CO_2$ absorption tower at positions 11 and 12, respectively on the downstream side of the packing 8 in a flow direction of the combustion exhaust gas toward the combustion exhaust gas outlet port from the combustion exhaust gas inlet port, through a flow path, and the $CO_2$ absorption tower 1 is provided with an additional packing 8" between the positions 11 and 12. In this regard, the packing 8" is not a packing arranged between the absorption liquid inlet port 6 and the absorption liquid outlet port 7 of the $CO_2$ absorption tower, however, as the packing 8", a static-type mixer having a spiral porous blade can be used in a similar manner as in the packings 8, and 8'. Hereinafter, the packing 8", packing 8, and packing 8' shown in FIG. 3 are also referred to as "upper packing", "middle packing", and "lower packing", respectively. The second cooler 3 is a heat exchanger, and can cool circulating liquid that is an aqueous solution containing a small amount of amine compound, or the like by heat exchange with cooling water. As a means for cooling the circulating liquid from the $CO_2$ absorption tower in the second cooler 3, for example, a typical technique such as a bowl type liquid collector or a chimney tray can be used.

The carbon dioxide-absorbing apparatus shown in FIG. 4 is provided with a $CO_2$ absorption tower 1, and a first cooler 2.

The $CO_2$ absorption tower 1 shown in FIG. 4 is provided with a combustion exhaust gas inlet port 4, a combustion exhaust gas outlet port 5, an absorption liquid inlet port 6, an absorption liquid outlet port 7, and two packings 8, and 8' each being a static-type mixer having a spiral porous blade. In this regard, the packings 8, and 8' are arranged between the combustion exhaust gas inlet port 4 and the combustion exhaust gas outlet port 5 and between the absorption liquid inlet port 6 and the absorption liquid outlet port 7. The combustion exhaust gas introduced into the $CO_2$ absorption tower 1 flows from the combustion exhaust gas inlet port 4 toward the combustion exhaust gas outlet port 5, and the amine compound-containing absorption liquid introduced into the $CO_2$ absorption tower 1 flows from the absorption liquid inlet port 6 toward the absorption liquid outlet port 7. In FIG. 4, the $CO_2$ contained in a combustion exhaust gas can be efficiently reactively absorbed in an amine compound-containing absorption liquid by bringing the amine compound-containing absorption liquid into concurrent contact with the combustion exhaust gas in the packings 8 and 8'. In this regard, the number of the packings to be arranged in the $CO_2$ absorption tower is not particularly limited. Hereinafter, the packing 8, and packing 8' shown in FIG. 4 are also referred to as "upper packing", and "lower packing", respectively.

In the first cooler 2 shown in FIG. 4, an absorption liquid recovery port for recovering an amine compound-containing absorption liquid from the $CO_2$ absorption tower is connected to the $CO_2$ absorption tower 1 at the absorption liquid outlet port 7 of the $CO_2$ absorption tower 1, through a flow path, and an absorption liquid supply port for supplying an amine compound-containing absorption liquid to the $CO_2$ absorption tower is connected to the $CO_2$ absorption tower 1 at a position 10 on the upstream side of the packing 8' in a flow direction of the amine compound-containing absorption liquid, through a flow path. The first cooler 2 is a heat exchanger, and can cool an amine compound-containing absorption liquid by heat exchange with cooling water.

The carbon dioxide-absorbing apparatuses shown in FIGS. 3 and 4 are each provided with a pressure gauge P, a thermometer T, a flowmeter F, a liquid level gauge L, and a $CO_2$ analyzer, and equipped with a control loop.

In general, $SO_x$ and powder dust are removed from a combustion exhaust gas, and the resultant exhaust gas is cooled in a pretreatment step, and the cooled exhaust gas is supplied to a $CO_2$ absorption tower. In FIG. 3, a combustion exhaust gas from the pretreatment step is supplied to the $CO_2$ absorption tower from the combustion exhaust gas inlet port 4 positioned in the lower part of the $CO_2$ absorption tower 1 through a combustion exhaust gas supply flow path, ascends in the absorption tower, and passes through the packings 8', 8, and 8" in this order. The exhaust gas in which $CO_2$ has been removed is discharged out of the system from the combustion exhaust gas outlet port 5 positioned in the upper part of the $CO_2$ absorption tower 1. In FIG. 4, a combustion exhaust gas from the pretreatment step is supplied to the $CO_2$ absorption tower from the combustion exhaust gas inlet port 4 positioned in the upper part of the $CO_2$ absorption tower 1 through a combustion exhaust gas supply flow path, descends in the absorption tower, and passes through the packings 8, and 8' in this order. The exhaust gas in which $CO_2$ has been removed is discharged out of the system from the combustion exhaust gas outlet port 5 positioned in the lower part of the $CO_2$ absorption tower 1.

In FIGS. 3 and 4, the amine compound-containing absorption liquid is used cyclically, and the amine compound-containing absorption liquid in which $CO_2$ has been separated and which has been regenerated in a method for regenerating an amine compound-containing absorption liquid is supplied from a $CO_2$ desorption tower to the $CO_2$ absorption tower 1 through an absorption liquid supply flow path. As shown in FIGS. 3 and 4, when supplied from a $CO_2$ desorption tower to the $CO_2$ absorption tower 1, the amine compound-containing absorption liquid is preferably cooled by an absorption liquid cooler. In FIG. 3, by being supplied into the $CO_2$ absorption tower 1 through the absorption liquid inlet port 6 positioned on the upper side of the middle packing 8, the amine compound-containing absorption liquid from a $CO_2$ desorption tower can be brought into countercurrent contact with the combustion exhaust gas ascending in the $CO_2$ absorption tower 1 in the middle packing 8 and the lower packing 8'. In FIG. 4, by being supplied into the $CO_2$ absorption tower 1 through an absorption liquid inlet port 6 positioned on the upper side of the upper packing 8, the amine compound-containing absorption liquid from a $CO_2$ desorption tower can be brought into concurrent contact with the combustion exhaust gas descending in the $CO_2$ absorption tower 1 in the upper packing 8 and the lower packing 8'.

Further, the $CO_2$ absorption tower 1 shown in FIG. 3 has two coolers separately from the absorption liquid cooler for cooling the amine compound-containing absorption liquid from a $CO_2$ desorption tower. The second cooler 3 positioned in the upper part is arranged for the prevention of entrainment in the exhaust gas at the top of the tower, and the circulating liquid cooled by the second cooler 3 can be supplied into the $CO_2$ absorption tower 1 from the connection position 11 on the upper side of the upper packing 8". The circulating liquid is cyclically used by being supplied into the $CO_2$ absorption tower 1, and then passing through the upper packing 8", and being recovered, and by bringing the circulating liquid into countercurrent contact with the combustion exhaust gas ascending in the $CO_2$ absorption tower 1 in the upper packing 8", the droplets of the amine compound in the combustion exhaust gas can be efficiently recovered. In addition, the first cooler 2 positioned in the lower part is arranged for removing the heat generated due to reactive absorption, and by recovering a part of the amine compound-containing absorption liquid that has been supplied to the $CO_2$ absorption tower 1 and has passed through the middle packing 8 from the connection position 9, cooling the recovered amine compound-containing absorption liquid, and supplying the cooled amine compound-containing absorption liquid from the connection position 10 on the upper side of the lower packing 8', the amine compound-containing absorption liquid can also be brought into countercurrent contact with the combustion exhaust gas ascending in the $CO_2$ absorption tower 1 in the lower packing 8'.

On the other hand, in the $CO_2$ absorption tower 1 shown in FIG. 4, except for the absorption liquid cooler for cooling the amine compound-containing absorption liquid from a $CO_2$ desorption tower, the cooling device is only the first cooler 2 whose absorption liquid recovery port is connected to the absorption liquid outlet port 7 at the bottom of the tower. The amine compound-containing absorption liquid accumulated in the bottom part of the $CO_2$ absorption tower 1 is supplied to a $CO_2$ desorption tower, and in FIG. 4, a part of the amine compound-containing absorption liquid to be supplied to a $CO_2$ desorption tower is pumped up by a pump or the like, and cooled by the first cooler 2, and then the cooled amine compound-containing absorption liquid is supplied to the $CO_2$ absorption tower 1 from the connection position 10 on the upper side of the lower packing 8'. In this way, the amine compound-containing absorption liquid can be brought into concurrent contact with the combustion exhaust gas descending in the $CO_2$ absorption tower 1 in the lower packing 8' while removing the heat generated due to reactive absorption. Further, the $CO_2$ absorption tower 1 shown in FIG. 4 is not provided with a cooler for the prevention of entrainment, however, a mist separator for the prevention of entrainment is connected to the combustion exhaust gas outlet port 5 instead. In this regard, the liquid separated by the mist separator is sent to the bottom part of the $CO_2$ absorption tower 1.

The operation in the $CO_2$ absorption tower is reactive absorption. Therefore, the contact mixing of gas and liquid in the $CO_2$ absorption tower is preferably operated by concurrent flow. However, in a case where a typical packing of the $CO_2$ absorption tower by conventional countercurrent operation is changed to a high-performance packing, it is possible to replace only the packing while maintaining the countercurrent state as shown in FIG. 3 in order to reduce the cost of remodeling.

As shown in FIGS. 3 and 4, since a $CO_2$ absorption tower bottom liquid that has absorbed $CO_2$ is accumulated in the bottom part of the $CO_2$ absorption tower, the $CO_2$ absorption tower bottom liquid is supplied to a $CO_2$ desorption tower through an absorption liquid supply flow path.

The amine compound-containing absorption liquid-regenerating apparatus according to the present invention is an apparatus for regenerating an amine compound-containing absorption liquid being provided with a $CO_2$ desorption tower for desorbing $CO_2$ contained in an amine compound-containing absorption liquid from the amine compound-containing absorption liquid, and at least one heater selected from the group consisting of a first heater for heating the amine compound-containing absorption liquid and a second heater for heating the amine compound-containing absorption liquid to generate steam, wherein:

the $CO_2$ desorption tower is provided with an absorption liquid inlet port for introducing the amine compound-containing absorption liquid into the $CO_2$ desorption tower, an absorption liquid outlet port for discharging the amine compound-containing absorption liquid from the $CO_2$ desorption tower, a steam inlet port for introducing the steam into the $CO_2$ desorption tower, a $CO_2$ outlet port for discharging the $CO_2$ from the $CO_2$ desorption tower, and a packing that is a static-type mixer having a spiral porous blade, wherein the packing is arranged between the absorption liquid inlet port and the absorption liquid outlet port and between the steam inlet port and the $CO_2$ outlet port;

the first heater is provided with an absorption liquid recovery port for recovering the amine compound-containing absorption liquid from the $CO_2$ desorption tower, and an absorption liquid supply port for supplying the amine compound-containing absorption liquid to the $CO_2$ desorption tower, wherein the absorption liquid recovery port and the absorption liquid supply port are connected to the $CO_2$ desorption tower at a position on the downstream side of the packing in a flow direction of the amine compound-containing absorption liquid toward the absorption liquid outlet port from the absorption liquid inlet port; and the second heater is provided with an absorption liquid recovery port for recovering the amine compound-containing absorption liquid from the $CO_2$ desorption tower, and a steam supply port for supplying the steam to the $CO_2$ desorption tower, wherein the absorption liquid recovery port is connected to the $CO_2$ desorption tower at a position on the downstream side of the packing in the flow direction of the amine compound-containing absorption liquid, and the steam supply port is connected to the steam inlet port of the $CO_2$ desorption tower.

In the amine compound-containing absorption liquid-regenerating apparatus according to the present invention, by providing a packing being a static-type mixer having a spiral porous blade, which is arranged between the absorption liquid inlet port and the absorption liquid outlet port and between the steam inlet port and the $CO_2$ outlet port, inside the $CO_2$ desorption tower, an amine compound-containing absorption liquid is brought into countercurrent contact with steam in the packing, the $CO_2$ contained in the amine compound-containing absorption liquid can be efficiently desorbed to separate the $CO_2$from the amine compound-containing absorption liquid, and thus the amine compound-containing absorption liquid can be regenerated and further the $CO_2$ can be recovered. In this regard, in the amine compound-containing absorption liquid-regenerating apparatus according to the present invention, the number of the packings to be arranged in the $CO_2$ desorption tower is not particularly limited, and may be one or two or more.

Further, the static-type mixer having a spiral porous blade as a packing is as described above. By using the above-described static-type mixer having a spiral porous blade as a packing in the $CO_2$ desorption tower, the differential pressure of the $CO_2$ desorption tower can be reduced, and as a result of which the operating pressure is lowered, the temperature inside the $CO_2$ desorption tower is lowered, and the thermal decomposition and polymerization of the $CO_2$ absorption liquid are significantly suppressed, and thus the safety can be improved.

The amine compound-containing absorption liquid is also as described above, and in the amine compound-containing absorption liquid-regenerating apparatus according to the present invention, the amine compound-containing absorption liquid introduced into the $CO_2$ desorption tower is an amine compound-containing absorption liquid that has reactively absorbed $CO_2$ by using it in the method for absorbing carbon dioxide, for example, an amine compound-containing absorption liquid that has reactively absorbed $CO_2$ by using it in the method for absorbing carbon dioxide according to the present invention. The amine compound-containing absorption liquid introduced into the $CO_2$ desorption tower is usually heated by steam (for example, steam of amine compound and water) ascending in the $CO_2$ desorption tower, and $CO_2$ is desorbed from the amine compound-containing absorption liquid. The $CO_2$ separated from the amine compound-containing absorption liquid ascends in the $CO_2$ desorption tower, is discharged from the $CO_2$ outlet port positioned at the top part of the desorption tower, passes through a gas-liquid separator, and can be recovered. On the other hand, the $CO_2$ is removed, the regenerated amine compound-containing absorption liquid is accumulated in the bottom part of the $CO_2$ desorption tower, the accumulated amine compound-containing absorption liquid is supplied to a $CO_2$ absorption tower, and thus the cyclic use can be performed.

As the steam to be brought into contact with an amine compound-containing absorption liquid, steam or the like can be used, and by using a second heater as described later, steam of amine compound and water is generated from the amine compound-containing absorption liquid, and the steam can also be used.

In the amine compound-containing absorption liquid-regenerating apparatus according to the present invention, the first heater is suitable for efficiently performing the heat recovery of an amine compound-containing absorption liquid from the bottom of the $CO_2$ desorption tower, and as a result, the temperature inside the $CO_2$ desorption tower is optimized, and the action of $CO_2$ desorption can be stably exerted in the $CO_2$ desorption tower. In this regard, in a case where the $CO_2$ desorption tower is provided with multiple packings, the absorption liquid recovery port of the first heater has only to be connected to the $CO_2$ desorption tower at a position on the downstream side of at least one of the packings in a flow direction of the amine compound-containing absorption liquid toward the absorption liquid outlet port from the absorption liquid inlet port of the $CO_2$ desorption tower. The absorption liquid supply port of the first heater is preferably connected to the $CO_2$ desorption tower at a position on the downstream side of the position where the absorption liquid recovery port has been connected in a flow direction of the amine compound-containing absorption liquid, and further, in a case where the $CO_2$ desorption tower is provided with multiple packings, the absorption liquid supply port of the first heater is preferably connected to the $CO_2$ desorption tower at a position on the downstream side of the packing positioned on the most downstream side in the flow direction of the amine compound-containing absorption liquid. In this regard, the absorption liquid to be heated by the first heater is an amine compound-containing absorption liquid introduced into the $CO_2$ desorption tower in order to desorb the $CO_2$ contained in the amine compound-containing absorption liquid.

In the amine compound-containing absorption liquid-regenerating apparatus according to the present invention, the second heater can generate steam of amine compound and water from a part of the amine compound-containing absorption liquid, and can use the generated steam as a steam for desorbing $CO_2$ from an amine compound-containing absorption liquid. In this regard, the absorption liquid recovery port of the second heater is preferably arranged, for example, at a position where an amine compound-containing absorption liquid accumulated in the bottom part of the $CO_2$ desorption tower can be recovered. Further, from the viewpoint of optimizing the temperature in the $CO_2$ desorption tower, the steam inlet port of the $CO_2$ desorption tower is preferably arranged at a position on the downstream side of the position where the absorption liquid supply port of the first heater has been connected in a flow direction of the amine compound-containing absorption liquid toward the absorption liquid outlet port from the absorption liquid inlet port of the $CO_2$ desorption tower.

The amine compound-containing absorption liquid-regenerating apparatus according to the present invention is preferably provided with a gas-liquid separator for separating the $CO_2$ discharged together with the steam from the $CO_2$ outlet port of the $CO_2$ desorption tower into gas and liquid.

The gas-liquid separator is provided with a $CO_2$ inlet port for introducing the $CO_2$ discharged together with the steam into the gas-liquid separator, a $CO_2$ recovery port for recovering the $CO_2$ obtained by gas-liquid separation, and a liquid outlet port for discharging the liquid obtained by gas-liquid separation, wherein the $CO_2$ inlet port is connected to the $CO_2$ outlet port of the $CO_2$ desorption tower, and the liquid outlet port is connected to the absorption liquid inlet port of the $CO_2$ desorption tower. By using a gas-liquid separator, $CO_2$ having high purity can be recovered, and further the separated water or the like can be returned into the $CO_2$ desorption tower as a reflux liquid.

In a case where a heat source of the second heater is steam, the amine compound-containing absorption liquid-regenerating apparatus according to the present invention is preferably provided with a superheated steam prevention device for reducing the temperature and pressure of steam to be supplied to the second heater as the heat source of the second heater, which is connected to the second heater. By reducing the temperature and pressure of steam to be supplied to the second heater, the generation of a polymer on a heat transfer wall surface of the heater can be suppressed, and the operation can be safely performed for a long time.

The method for regenerating an amine compound-containing absorption liquid according to the present invention comprises:

a first step of desorbing $CO_2$ from an amine compound-containing absorption liquid containing the $CO_2$ by bringing the amine compound-containing absorption liquid into countercurrent contact with steam in a packing to regenerate the amine compound-containing absorption liquid and further to recover the $CO_2$, in which the amine compound-containing absorption liquid flows from an absorption liquid inlet port to an absorption liquid outlet port and the steam flows from a steam inlet port to a $CO_2$ outlet port, in a $CO_2$ desorption tower being provided with the absorption liquid inlet port for introducing the amine compound-containing absorption liquid into the $CO_2$ desorption tower, the absorption liquid outlet port for discharging the amine compound-containing absorption liquid from the $CO_2$ desorption tower, the steam inlet port for introducing the steam into the $CO_2$ desorption tower, the $CO_2$ outlet port for discharging the $CO_2$ from the $CO_2$ desorption tower, and the packing that is a static-type mixer having a spiral porous blade; and at least one step selected from the group consisting of a second step of recovering a part of the amine compound-containing absorption liquid from the $CO_2$ desorption tower at a position on the downstream side of the packing in a flow direction of the amine compound-containing absorption liquid toward the absorption liquid outlet port from the absorption liquid inlet port, heating the recovered amine compound-containing absorption liquid, and supplying the heated amine compound-containing absorption liquid to the $CO_2$ desorption tower at a position on the downstream side of the packing in the flow direction of the amine compound-containing absorption liquid and a third step of recovering a part of the amine compound-containing absorption liquid from the $CO_2$ desorption tower at a position on the downstream side of the packing in the flow direction of the amine compound-containing absorption liquid, heating the recovered amine compound-containing absorption liquid to generate steam, and supplying the steam to the $CO_2$ desorption tower from the steam inlet port.

The method for regenerating an amine compound-containing absorption liquid according to the present invention preferably comprises a fourth step of separating the $CO_2$ discharged together with the steam from the $CO_2$ outlet port into gas and liquid, recovering the separated $CO_2$, and further supplying the separated liquid from the absorption liquid inlet port to the $CO_2$ desorption tower.

In a case where heating of the amine compound-containing absorption liquid is performed by heat exchange with the steam in the third step, the method for regenerating an amine compound-containing absorption liquid according to the present invention preferably comprises a fifth step of reducing the temperature and pressure of the steam to be used for the heat exchange before the heat exchange is performed in the third step.

The method for regenerating an amine compound-containing absorption liquid according to the present invention can be performed by utilizing the above-described amine compound-containing absorption liquid-regenerating apparatus according to the present invention, and specifically, the first step can be performed by using the $CO_2$ desorption tower, the second step can be performed by using the first heater, the third step can be performed by using the second heater, the fourth step can be performed by using the gas-liquid separator, and the fifth step can be performed by using the superheated steam prevention device.

Figure 5:
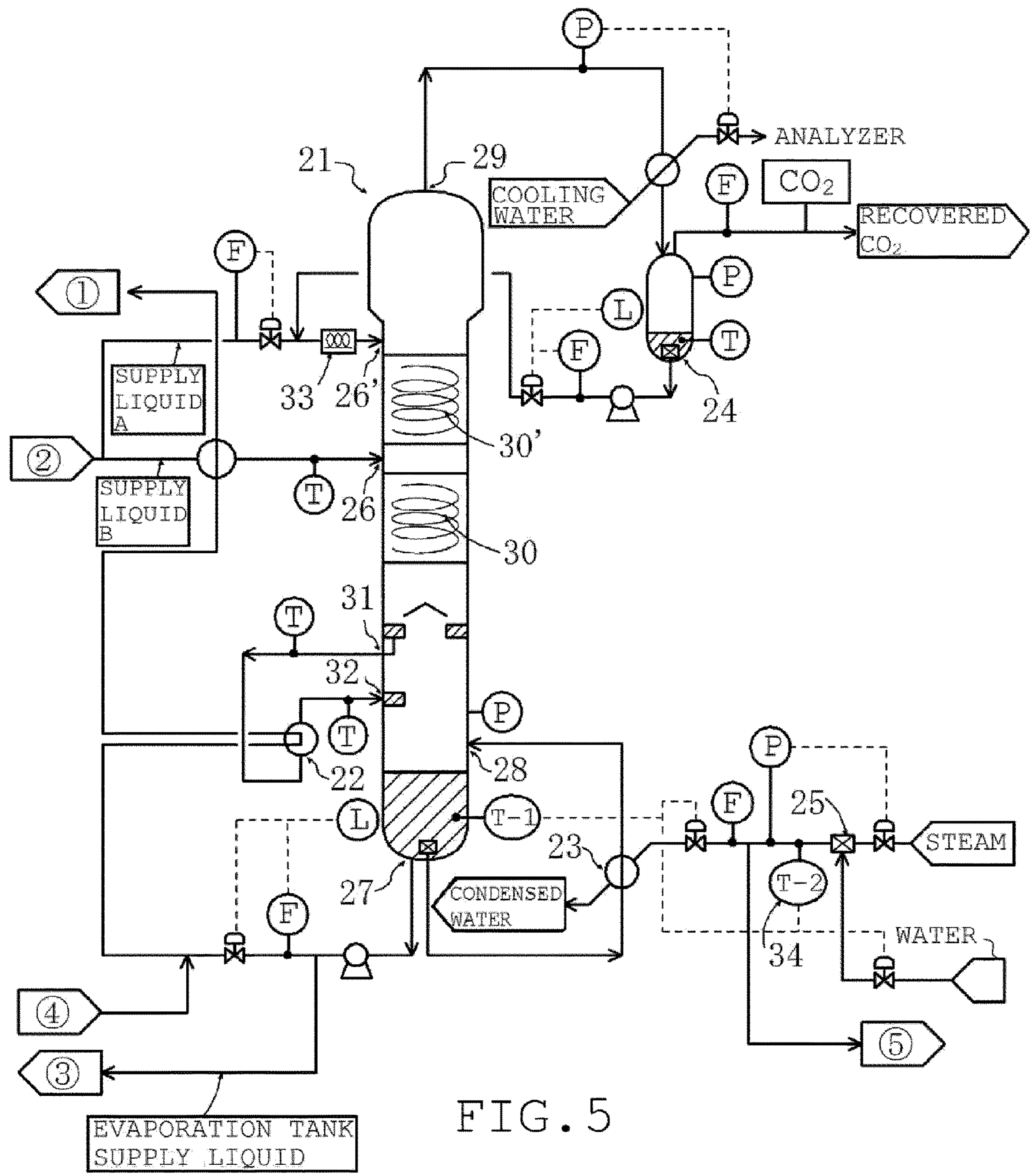
FIG. 5 is a control flow diagram schematically showing an embodiment of the method for regenerating an amine compound-containing absorption liquid according to the present invention utilizing an embodiment of the amine compound-containing absorption liquid-regenerating apparatus according to the present invention, in an embodiment of the method for recovering carbon dioxide according to the present invention. The number 1 enclosed in a circle in FIG. 5 indicates the flow of the amine compound-containing absorption liquid to be supplied to the number 1 enclosed in a circle in FIG. 1 or 2, the number 2 enclosed in a circle in FIG. 5 indicates the flow of the amine compound-containing absorption liquid supplied from the number 2 enclosed in a circle in FIG. 1 or 2, the number 3 enclosed in a circle in FIG. 5 indicates the flow of the amine compound-containing absorption liquid to be supplied to the number 3 enclosed in a circle in FIG. 6, the number 4 enclosed in a circle in FIG. 5 indicates the flow of the amine compound-containing absorption liquid supplied from the number 4 enclosed in a circle in FIG. 6, and the number 5 enclosed in a circle in FIG. 5 indicates the flow of the steam to be supplied to the number 5 enclosed in a circle in FIG. 6.

Next, embodiments of the amine compound-containing absorption liquid-regenerating apparatus according to the present invention and the method for regenerating an amine compound-containing absorption liquid according to the present invention will be described with reference to FIG. 5. FIG. 5 is a control flow diagram schematically showing an embodiment of the method for regenerating an amine compound-containing absorption liquid according to the present invention utilizing an embodiment of the amine compound-containing absorption liquid-regenerating apparatus according to the present invention, in an embodiment of the method for recovering carbon dioxide according to the present invention.

The amine compound-containing absorption liquid-regenerating apparatus shown in FIG. 5 is provided with a $CO_2$ desorption tower 21, a first heater 22, a second heater 23, a gas-liquid separator 24, and a superheated steam prevention device 25.

The $CO_2$ desorption tower 21 shown in FIG. 5 is provided with two absorption liquid inlet ports 26 and 26', an absorption liquid outlet port 27, a steam inlet port 28, a $CO_2$ outlet port 29, and packings 30 and 30' each being a static-type mixer having a spiral porous blade. In this regard, the packing 30 is arranged between the absorption liquid inlet ports 26 and 26' and the absorption liquid outlet port 27 and between the steam inlet port 28 and the $CO_2$ outlet port 29, and the packing 30' is arranged between the absorption liquid inlet port 26' and the absorption liquid outlet port 27 and between the steam inlet port 28 and the $CO_2$ outlet port 29. The amine compound-containing absorption liquid introduced into the $CO_2$desorption tower 21 flows from the absorption liquid inlet ports 26 and 26' toward the absorption liquid outlet port 27, and the steam introduced into the $CO_2$ desorption tower 21 flows from the steam inlet port 28 toward the $CO_2$ outlet port 29. In FIG. 5, the amine compound-containing absorption liquid is brought into counter-current contact with the steam in the packings 30 and 30' to efficiently desorb the $CO_2$ contained in the amine compound-containing absorption liquid, the $CO_2$ is separated from the amine compound-containing absorption liquid, and the amine compound-containing absorption liquid is regenerated and further the $CO_2$ can be recovered. In this regard, the number of the packings to be arranged in the $CO_2$ desorption tower is not particularly limited. Hereinafter, the packing 30, and packing 30' shown in FIG. 5 are also referred to as "lower packing", and "upper packing", respectively. Further, the $CO_2$ desorption tower 21 is provided with multiple absorption liquid inlet ports in FIG. 5, however, in the present invention, the $CO_2$ desorption tower 21 is not limited thereto, and may also be provided with only one absorption liquid inlet port.

In the first heater 22 shown in FIG. 5, an absorption liquid recovery port for recovering an amine compound-containing absorption liquid from the $CO_2$ desorption tower is connected to the $CO_2$ desorption tower 21 at a position 31 on the downstream side of the packing 30 in a flow direction of the amine compound-containing absorption liquid toward the absorption liquid outlet port from the absorption liquid inlet port, through a flow path, and an absorption liquid supply port for supplying an amine compound-containing absorption liquid to the $CO_2$ desorption tower is connected to the $CO_2$ desorption tower 21 at a position 32 on the downstream side of the position 31 in the flow direction of the amine compound-containing absorption liquid, through a flow path. The first heater 22 is a heat exchanger, and by the heat exchange with the amine compound-containing absorption liquid discharged from the absorption liquid outlet port 27 of the $CO_2$ desorption tower 21, the amine compound-containing absorption liquid passing through the first heater can be heated. As a means for heating the amine compound-containing absorption liquid in the first heater 22 from the $CO_2$ desorption tower, for example, a typical technique such as a bowl type liquid collector or a chimney tray can be used.

In the second heater 23 shown in FIG. 5, an absorption liquid recovery port for recovering an amine compound-containing absorption liquid from the $CO_2$ desorption tower is connected to the $CO_2$ desorption tower 21 in the bottom part of the $CO_2$ desorption tower 21, through a flow path, and a steam supply port for supplying steam to the $CO_2$ desorption tower is connected to the steam inlet port 28 of the $CO_2$ desorption tower 21 positioned on the downstream side of the position 32 to which the absorption liquid supply port of the first heater 22 has been connected in a flow direction of the amine compound-containing absorption liquid toward the absorption liquid outlet port from the absorption liquid inlet port, through a flow path. The second heater 23 is a heat exchanger, and can generate steam of amine compound and water from an amine compound-containing absorption liquid by heat exchange with steam. As a means for heating the amine compound-containing absorption liquid in the second heater 23 from the $CO_2$ desorption tower, for example, a typical technique such as a reboiler can be used.

In the gas-liquid separator 24 shown in FIG. 5, a $CO_2$ inlet port for introducing the $CO_2$ discharged together with the steam into the gas-liquid separator is connected to the $CO_2$ outlet port 29 of the $CO_2$ desorption tower 21, through a flow path, and a cooler is provided in the middle of the flow path, and thus the gas-liquid separation can be efficiently performed by heat exchange with cooling water. Further, a liquid outlet port for discharging the liquid obtained by gas-liquid separation is connected to the absorption liquid inlet port 26' of the $CO_2$ desorption tower 21, through a flow path, and the flow path for connecting the gas-liquid separator 24 to the absorption liquid inlet port 26' of the $CO_2$ desorption tower 21 is connected to a flow path for connecting the absorption liquid outlet port of the $CO_2$ absorption tower to the absorption liquid inlet port 26' of the $CO_2$ desorption tower 21, and a static-type mixer 33 is arranged between the connection position and the absorption liquid inlet port 26'.

The superheated steam prevention device 25 shown in FIG. 5 is connected to the second heater 23 through a flow path, and can supply saturated steam obtained by reducing the temperature and pressure of the superheated steam to the second heater 23. In addition, a steam supply system shown in FIG. 5 is also used in an amine compound-containing absorption liquid-purifying apparatus to be described later, the superheated steam prevention device 25 is connected also to a heating jacket of an evaporation tank, and can supply saturated steam obtained by reducing the temperature and pressure of the superheated steam to the heating jacket.

The amine compound-containing absorption liquid-regenerating apparatus shown in FIG. 5 is provided with pressure gauges P, thermometers T, flowmeters F, liquid level gauges L, and a $CO_2$ analyzer, and is equipped with a control loop.

In FIG. 5, the amine compound-containing absorption liquid that has reactively absorbed $CO_2$ by using it in the method for absorbing carbon dioxide is supplied to the $CO_2$ desorption tower 21 in two systems. In the first system, a part of the amine compound-containing absorption liquid that has reactively absorbed $CO_2$ is supplied into the $CO_2$ desorption tower 21 as a supply liquid A from the absorption liquid inlet port 26' positioned on the upper side of the upper packing 30' of the $CO_2$ desorption tower 21. The supply liquid A is preferably supplied to the $CO_2$ desorption tower 21 while being in a state that a $CO_2$ absorption tower bottom liquid discharged from a $CO_2$ absorption tower is cooled without being heated. Further, it is preferred that the supply liquid A is mixed by using, for example, a static-type mixer 33 together with a reflux liquid (water or the like) that has separated at the time of recovering the $CO_2$ discharged from the $CO_2$ outlet port 29 positioned at the top part of the $CO_2$ desorption tower 21, and the resultant mixture is supplied into the $CO_2$ desorption tower 21. The cooled supply liquid A has a role of refluxing in the $CO_2$ desorption tower 21 and preventing the entrainment. In the second system, the remainder of the amine compound-containing absorption liquid that has reactively absorbed $CO_2$ is supplied into the $CO_2$ desorption tower 21 as a supply liquid B from the absorption liquid inlet port 26 positioned on the upper side of the lower packing 30 and positioned on the lower side of the upper packing 30' of the $CO_2$ desorption tower 21. In this regard, the supply liquid B is heated, the heated supply liquid B is supplied into the $CO_2$ desorption tower 21, and at this time, it is preferred to heat the supply liquid B before being supplied to the $CO_2$ desorption tower 21 by heat exchange with a tower bottom liquid accumulated in the bottom part of the $CO_2$ desorption tower 21. Since the tower bottom liquid is an amine compound-containing absorption liquid in which $CO_2$ has been removed and which has been regenerated, the tower bottom liquid is preferably supplied to a $CO_2$ absorption tower, and further, at that time, it is preferred to cool the amine compound-containing absorption liquid by heat exchange with the supply liquid B.

As the characteristics of the distribution of the temperature inside the $CO_2$ desorption tower, the temperature difference between the bottom inside the $CO_2$ desorption tower and the part where a packing has been arranged inside the $CO_2$ desorption tower (hereinafter, also referred to as "packing layer") becomes usually 10° C. or more, and according to an embodiment of the amine compound-containing absorption liquid-regenerating apparatus of the present invention, the heat recovery can be efficiently performed by arranging a first heater 22 at a position between the bottom of the $CO_2$ desorption tower 21 and the packing layer. In FIG. 5, the $CO_2$ desorption tower 21 is provided with multiple packings 30 and 30', and in this case, connection positions 31 and 32 of the first heater and the $CO_2$ desorption tower are preferably arranged at a position between the packing layer on the lowermost side (lower packing layer) and the bottom of the tower. In FIG. 5, in the first heater 22, the connection position 31 of the first heater and the $CO_2$ desorption tower is arranged on the lower side of the lower packing 30. A part of the amine compound-containing absorption liquid descending in the $CO_2$ desorption tower 21 is recovered at the connection position 31, the recovered amine compound-containing absorption liquid is heated by the heater 22 by heat exchange with the tower bottom liquid discharged from the $CO_2$ desorption tower 21 in order to supply the amine compound-containing absorption liquid to a $CO_2$ absorption tower, and the heated amine compound-containing absorption liquid is returned into the $CO_2$ desorption tower 21 from the connection position 32. In this regard, it is preferred that in the first heater 22, the connection position 31 is arranged at a position where an amine compound-containing absorption liquid having a temperature difference with the tower bottom of 10° C. or more (that is, amine compound-containing absorption liquid having a temperature 10° C. or more lower than the temperature at the tower bottom) can be recovered in a case where the first heater 22 has not been arranged.

In FIG. 5, a part of the tower bottom liquid of the $CO_2$ desorption tower 21 is recovered from the bottom part of the $CO_2$ desorption tower 21 connected to the absorption liquid recovery port of the second heater 23, the heat exchange with saturated steam is performed in the second heater 23 to generate steam of amine compound and water, and then the steam is supplied into the $CO_2$ desorption tower 21 from the steam inlet port 28, and ascends in the $CO_2$ desorption tower 21. By using the steam, the $CO_2$ contained in an amine compound-containing absorption liquid is desorbed and can be separated from the amine compound-containing absorption liquid introduced into the $CO_2$ desorption tower 21, and thus the amine compound-containing absorption liquid can be regenerated.

In FIG. 5, the $CO_2$ separated from an amine compound-containing absorption liquid ascends together with steam in the $CO_2$ desorption tower 21, and discharged from the $CO_2$ outlet port 29 positioned at the top part of the desorption tower. After that, by performing gas-liquid separation, the $CO_2$ can be recovered, and further the separated water or the like can be mixed with a supply liquid A as a reflux liquid.

In FIG. 5, by reducing the temperature and pressure of steam to be supplied to the second heater 23 by the superheated steam prevention device 25, the generation of a polymer on a heat transfer wall surface of a heater can be suppressed, and the operation can be safely performed for a long time. The supply temperature T−2 of the steam to be measured by a setting thermometer 34 for a superheated steam prevention device is desirably set to be a temperature 5 to 30° C. higher than the tower bottom temperature T−1 of the $CO_2$ desorption tower 21.

In FIG. 5, a part of the tower bottom liquid of the $CO_2$ desorption tower 21 is supplied to an amine compound-containing absorption liquid-purifying apparatus as an evaporation tank supply liquid through an absorption liquid supply flow path.

According to preferred embodiments of the amine compound-containing absorption liquid-regenerating apparatus of the present invention and the method for regenerating an amine compound-containing absorption liquid of the present invention, the following two effects can be exerted.

1. The temperature in a $CO_2$ desorption tower is optimized and the effect of $CO_2$ desorption is improved. In particular, by setting the temperature difference between the tower bottom and the packing layer (lower packing layer in FIG. 5) in a $CO_2$ desorption tower to be 10° C. or less, and by increasing the temperature of the packing layer, the $CO_2$ desorption effect can be enhanced.

2. By adopting a high-performance packing with a low differential pressure, the operating pressure of a $CO_2$ desorption tower can be lowered, in particular, the temperature at the tower bottom is lowered, and not only the steam saving is realized but also the thermal decomposition of a $CO_2$ absorption liquid is suppressed, and thus the safety can be improved. For example, the above-described static-type mixer having a spiral porous blade can have a differential pressure ½ or less of the differential pressure of a typical packing (Raschig rings or the like), and therefore, it has become possible to reduce the bottom temperature in a $CO_2$ desorption tower by 4° C. or more. As a whole, 30% of the steam flow amount to be used in a second heater 23 can be reduced.

The amine compound-containing absorption liquid-purifying apparatus according to the present invention is an apparatus for purifying an amine compound-containing absorption liquid being provided with: an evaporation tank for evaporating and separating impurities contained in an amine compound-containing absorption liquid from the amine compound-containing absorption liquid, the evaporation tank being provided with a heating jacket arranged on the outside of the evaporation tank; a superheated steam prevention device for reducing the temperature and pressure of steam to be supplied as a heat source to the heating jacket; a gas-liquid separator for recovering the amine compound-containing absorption liquid evaporated and separated from the impurities; and a decompression device for reducing pressure in the evaporation tank, wherein:

the evaporation tank is provided with an absorption liquid inlet port for introducing the amine compound-containing absorption liquid into the evaporation tank, an absorption liquid outlet port for discharging the amine compound-containing absorption liquid evaporated and separated from the impurities from the evaporation tank, and an impurity outlet port for discharging the impurities evaporated and separated from the amine compound-containing absorption liquid from the evaporation tank;

the gas-liquid separator is provided with an absorption liquid inlet port for introducing the amine compound-containing absorption liquid evaporated and separated from the impurities into the gas-liquid separator, a gas outlet port for discharging gas obtained by gas-liquid separation, and a liquid outlet port for discharging liquid obtained by gas-liquid separation;

the decompression device is connected to the evaporation tank through an absorption liquid inlet port of the gas-liquid separator, a gas outlet port of the gas-liquid separator, and an absorption liquid outlet port of the evaporation tank; and the superheated steam prevention device is connected to the heating jacket.

There is a problem of the reduction in the reactive absorption performance of an amine compound-containing absorption liquid or the generation of the dirt or blockage of the apparatus due to the thermal decomposition of the amine compound-containing absorption liquid or the generation of a polymeric substance (for example, a polymeric substance generated by the thermal decomposition of the amine compound itself, a polymeric substance generated by the polymerization of other impurities, or the like) by the long-term operation of the apparatus, or the contaminants inevitably mixed from the pretreatment step.

The amine compound-containing absorption liquid-purifying apparatus according to the present invention is used in a method for absorbing carbon dioxide or a method for regenerating an amine compound-containing absorption liquid, and with the apparatus, an amine compound-containing absorption liquid containing impurities such as polymeric substances is introduced into an evaporation tank under vacuum decompression and is purified, the capacity of the amine compound-containing absorption liquid can be restored, and further the dirt or blockage of the apparatus can be prevented.

In the amine compound-containing absorption liquid-purifying apparatus according to the present invention, the evaporation tank is connected to the decompression device through the absorption liquid inlet port of the gas-liquid separator, the gas outlet port of the gas-liquid separator, and the absorption liquid outlet port of the evaporation tank, and the inside of the evaporation tank can be vacuum decompressed. The amine compound-containing absorption liquid containing the impurities that have generated due to long-term operation or have inevitably mixed from the pretreatment step is introduced from the absorption liquid inlet port of the evaporation tank into the evaporation tank under vacuum decompression, and in the evaporation tank, the impurities can be separated by evaporating the amine compound-containing absorption liquid, and thus a purified amine compound-containing absorption liquid can be obtained.

In the amine compound-containing absorption liquid-purifying apparatus according to the present invention, the gas-liquid separator performs gas-liquid separation on the amine compound-containing absorption liquid that has been evaporated and separated from impurities to separate the amine compound-containing absorption liquid from air and the like, and thus can recover a purified amine compound-containing absorption liquid.

In the amine compound-containing absorption liquid-purifying apparatus according to the present invention, since steam is used as a heat source for the heating jacket of the evaporation tank, the above superheated steam prevention device is provided. In view of the entire apparatus for recovering carbon dioxide, however, the superheated steam prevention device used in the amine compound-containing absorption liquid-purifying apparatus according to the present invention is preferably common to the superheated steam prevention device used in the amine compound-containing absorption liquid-purifying apparatus according to the present invention.

The method for purifying an amine compound-containing absorption liquid according to the present invention comprises: a first step of purifying an amine compound-containing absorption liquid containing impurities by continuously or intermittently introducing the amine compound-containing absorption liquid into an evaporation tank under vacuum decompression, and by evaporating and separating the amine compound-containing absorption liquid into the impurities and a purified amine compound-containing absorption liquid; a second step of supplying steam to a heating jacket arranged on the outside of the evaporation tank to heat the evaporation tank; and a third step of reducing the temperature and pressure of the steam before supplying the steam to the heating jacket in the second step. In this regard, the method for purifying an amine compound-containing absorption liquid according to the present invention can be performed by utilizing the above-described amine compound-containing absorption liquid-purifying apparatus according to the present invention.

In a case where an amine compound-containing absorption liquid is cyclically used in a method for recovering carbon dioxide in a combustion exhaust gas, impurities such as a minute amount of $SO_x$ and powder dust, which have come together with a combustion exhaust gas, and many kinds of decomposed and heavy components, which have generated in the system, are accumulated in the amine compound-containing absorption liquid. This becomes a factor that causes foaming and flooding in the tower, and becomes a major cause of the unstable operation, the reduction in operation time of the apparatus, the requirement of installation of a spare machine, and the increase in maintenance costs. Further, the deterioration of performance of the amine compound-containing absorption liquid, and the dirt or blockage of an instrument such as a packing, or a heat exchanger are caused.

According to the method for purifying an amine compound-containing absorption liquid of the present invention, by continuously or intermittently introducing a part of the amine compound-containing absorption liquid used in a $CO_2$ absorption tower or a $CO_2$ desorption tower into an evaporation tank under vacuum decompression, and by evaporating an amine compound and water, the amine compound-containing absorption liquid can be separated from thermal decomposition products and polymeric substances of the amine compound-containing absorption liquid, which have been generated by the long-term operation of devices such as a $CO_2$ absorption tower and a $CO_2$ desorption tower, and contaminants inevitably mixed from the pretreatment step. In this way, the amine compound-containing absorption liquid is purified and the capacity of the amine compound-containing absorption liquid can be restored. In addition, the heavy components and the like can be more efficiently removed rather than the mechanical removal by a conventional filter or the like.

In the method for purifying an amine compound-containing absorption liquid according to the present invention, as the amine compound-containing absorption liquid to be introduced into the evaporation tank, for example, an amine compound-containing absorption liquid that has reactively absorbed $CO_2$ by being used in a method for absorbing carbon dioxide, or an amine compound-containing absorption liquid in which $CO_2$ has been removed in a method for regenerating an amine an amine compound-containing absorption liquid can be mentioned, and specifically an amine compound-containing absorption liquid that has reactively absorbed $CO_2$ by using it in the method for absorbing carbon dioxide according to the present invention, or an amine compound-containing absorption liquid in which $CO_2$ has been removed in the method for regenerating an amine compound-containing absorption liquid according to the present invention can be mentioned.

Figure 6:
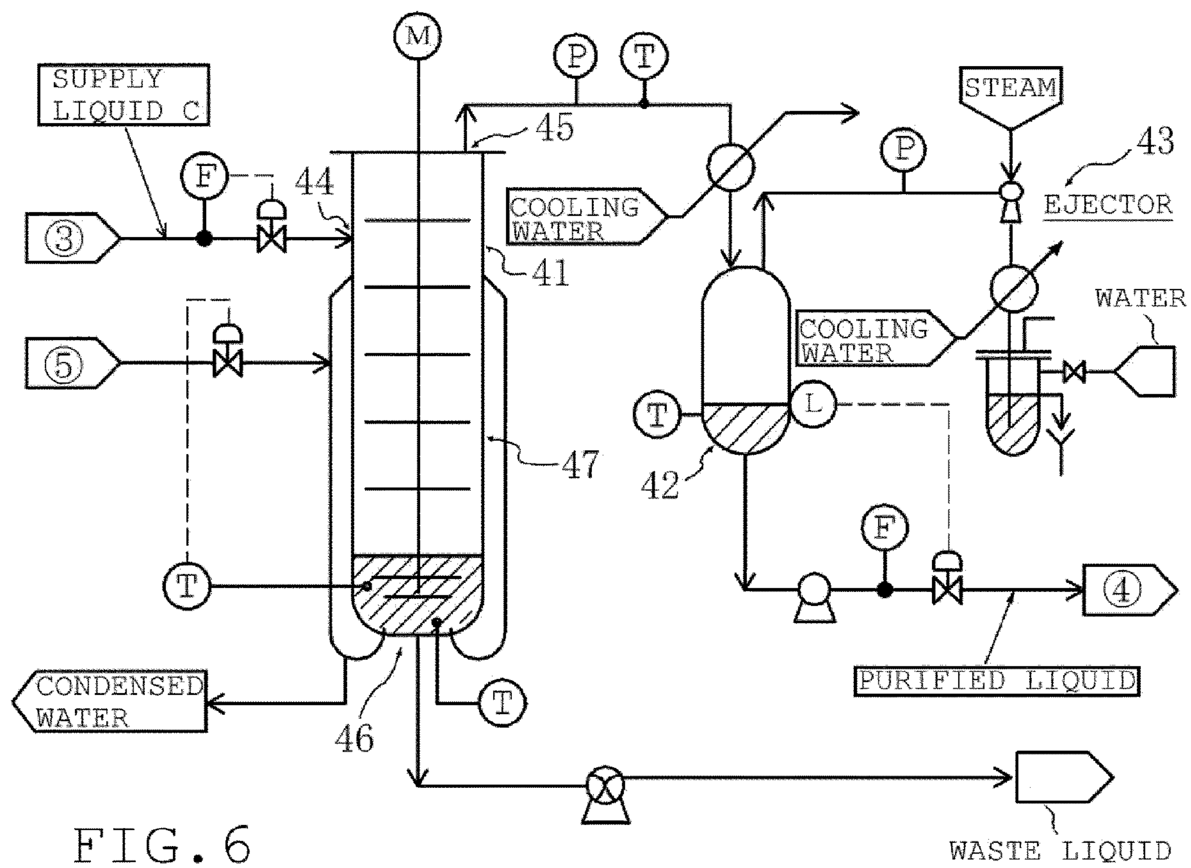
FIG. 6 is a control flow diagram schematically showing an embodiment of the method for purifying an amine compound-containing absorption liquid according to the present invention utilizing an embodiment of the amine compound-containing absorption liquid-purifying apparatus according to the present invention, in an embodiment of the method for recovering carbon dioxide according to the present invention. The number 3 enclosed in a circle in FIG. 6 indicates the flow of the amine compound-containing absorption liquid supplied from the number 3 enclosed in a circle in FIG. 5, the number 4 enclosed in a circle in FIG. 6 indicates the flow of the amine compound-containing absorption liquid to be supplied to the number 4 enclosed in a circle in FIG. 5, and the number 5 enclosed in a circle in FIG. 6 indicates the flow of the steam supplied from the number 5 enclosed in a circle in FIG. 5.

Next, embodiments of the amine compound-containing absorption liquid-purifying apparatus according to the present invention and the method for purifying an amine compound-containing absorption liquid according to the present invention will be described with reference to FIG. 6. FIG. 6 is a control flow diagram schematically showing an embodiment of the method for purifying an amine compound-containing absorption liquid according to the present invention utilizing an embodiment of the amine compound-containing absorption liquid-purifying apparatus according to the present invention, in an embodiment of the method for recovering carbon dioxide according to the present invention.

The amine compound-containing absorption liquid-purifying apparatus shown in FIG. 6 is provided with an evaporation tank 41, a superheated steam prevention device (not shown), a gas-liquid separator 42, and a decompression device 43.

The evaporation tank 41 shown in FIG. 6 is provided with an absorption liquid inlet port 44, an absorption liquid outlet port 45, and an impurity outlet port 46, and further provided with a heating jacket 47 arranged on the outside of the evaporation tank 41. In FIG. 6, a part of the bottom liquid of a $CO_2$ desorption tower is continuously or intermittently supplied as a supply liquid C from the absorption liquid inlet port 44 into the evaporation tank 41 through an absorption liquid supply flow path. In the evaporation tank 41, an amine compound-containing absorption liquid containing impurities is evaporated and separated, and the evaporated amine compound-containing absorption liquid is discharged from the absorption liquid outlet port 45. Since the evaporation tank 41 is provided with the heating jacket 55 arranged on the outside of the evaporation tank, the temperature in the evaporation tank 54 can be controlled. Further, the evaporation tank 41 is connected to the decompression device 43 through the gas-liquid separator 42, and therefore, the inside of the evaporation tank 41 can be maintained under vacuum decompression.

According to the amine compound-containing absorption liquid-purifying apparatus shown in FIG. 6, impurities such as contaminated heavy components contained in a supply liquid C can be evaporated and separated safely at a low temperature under vacuum decompression. Preferred conditions are a pressure of 5 to 500 Torr and a temperature of 50 to 90° C.

In the gas-liquid separator 42 shown in FIG. 6, an absorption liquid inlet port for introducing the amine compound-containing absorption liquid evaporated and separated from the impurities into the gas-liquid separator is connected to the absorption liquid outlet port 45 of the evaporation tank 41 through a flow path, a cooler is arranged in the middle of the flow path, and the gas-liquid separation can be efficiently performed by heat exchange in the cooler. An amine compound and water, which have been evaporated and separated from impurities such as contaminated heavy components, are discharged from the absorption liquid outlet port 45 positioned in the upper part of the evaporation tank 41, and then a minute amount of the contained air is separated by gas-liquid separation, and a purified amine compound-containing absorption liquid (purified liquid) can be recovered. The purified liquid can be supplied into a $CO_2$ absorption tower and a $CO_2$ desorption tower from a liquid outlet port of the gas-liquid separator through an absorption liquid supply flow path. The absorption liquid supply flow path of a purified liquid shown in FIG. 6 is connected to an absorption liquid supply flow path for supplying the amine compound-containing absorption liquid to the $CO_2$ absorption tower shown in FIG. 5, and the purified liquid is supplied to the $CO_2$ absorption tower together with the amine compound-containing absorption liquid in which $CO_2$ has been removed in the $CO_2$ desorption tower.

The decompression device 43 shown in FIG. 6 is a typical steam driven ejector for vacuum, and by using this, the inside of the evaporation tank 41 is vacuum-decompressed. However, the decompression device is not limited thereto in the amine compound-containing absorption liquid-purifying apparatus according to the present invention.

In the bottom part of the evaporation tank 41 shown in FIG. 6, impurities such as heavy components causing clogging, and a small amount of absorption liquid are accumulated, and therefore, these can be discharged as waste liquid to the outside of the system from the impurity outlet port 46 through a pump or the like. In this way, the performance of the amine compound-containing absorption liquid can be restored and maintained, and further the dirt and blockage of the apparatus can be prevented.

In the amine compound-containing absorption liquid-purifying apparatus according to the present invention and the method for purifying an amine compound-containing absorption liquid according to the present invention, the evaporation tank may be a typical evaporation tank, and preferably, a thin-film type wetted-wall evaporator with a stirrer, which can be operated under vacuum decompression, is effective for continuous operation. For the safety operation, as the heat source for the heating jacket, steam in which the temperature and pressure are reduced and which is used in a heater of a $CO_2$ desorption tower is preferred. The evaporation tank 41 shown in FIG. 6 is an evaporation tank comprising a stirrer with a motor M, and provided with a heating jacket 47 on the outside of the evaporation tank 41, in which a part of the steam prepared for use in the second heater 23 in FIG. 5 is supplied to the heating jacket 47. As a method for obtaining vacuum decompression, a method in which a refrigerant is used for cooling water of a steam ejector shown in FIG. 6, a vacuum pump (not shown), or a condenser (not shown) is effective.

The required supply liquid flow rate (flow rate of supply liquid C) to the evaporation tank 41 shown in FIG. 6 may be a flow rate that is 5% or less of the flow rate of the amine compound-containing absorption liquid, that is, the flow rate of the tower bottom liquid discharged from the bottom of a $CO_2$ desorption tower in order to supply the tower bottom liquid to a $CO_2$ absorption tower after the measure to be described later is performed in a pretreatment step of a combustion exhaust gas. The amine compound-containing absorption liquid-purifying apparatus according to the present invention is extremely important for safety operation and long-term stable operation of the $CO_2$ recovery facility.

The amine compound-containing absorption liquid-purifying apparatus shown in FIG. 6 is provided with pressure gauges P, thermometers T, flowmeters F, and a flowmeter L, and equipped with a control loop.

The combustion exhaust gas-pretreating apparatus according to the present invention is an apparatus for pretreating a combustion exhaust gas being provided with a pretreatment tower for performing desulfurization, dust removal, and cooling on a combustion exhaust gas, wherein:

the pretreatment tower is provided with a combustion exhaust gas inlet port for introducing the combustion exhaust gas into the pretreatment tower, a combustion exhaust gas outlet port for discharging the combustion exhaust gas from the pretreatment tower, a desulfurization liquid inlet port for introducing a desulfurization liquid into the pretreatment tower, a desulfurization liquid outlet port for discharging the desulfurization liquid from the pretreatment tower, and a packing that is a static-type mixer having a spiral porous blade, wherein the packing is arranged between the combustion exhaust gas inlet port and the combustion exhaust gas outlet port and between the desulfurization liquid inlet port and the desulfurization liquid outlet port; and the combustion exhaust gas inlet port is arranged on the upstream side of the packing in a flow direction of the desulfurization liquid toward the desulfurization liquid outlet port from the desulfurization liquid inlet port, and the desulfurization liquid inlet port is arranged on the upstream side of the packing in a flow direction of the combustion exhaust gas toward the combustion exhaust gas outlet port from the combustion exhaust gas inlet port.

In the combustion exhaust gas-pretreating apparatus according to the present invention, the pretreatment tower is provided with a packing being a static-type mixer having a spiral porous blade, which is arranged between the combustion exhaust gas inlet port and the combustion exhaust gas outlet port and between the desulfurization liquid inlet port and the desulfurization liquid outlet port, inside the pretreatment tower, wherein the combustion exhaust gas inlet port is arranged on the upstream side of the packing in a flow direction of the desulfurization liquid toward the desulfurization liquid outlet port from the desulfurization liquid inlet port, and the desulfurization liquid inlet port is arranged on the upstream side of the packing in a flow direction of the combustion exhaust gas toward the combustion exhaust gas outlet port from the combustion exhaust gas inlet port, and therefore, by bringing the combustion exhaust gas into concurrent contact with the desulfurization liquid in the packing, a pretreatment such as desulfurization reaction, dust removal, and gas cooling can be efficiently performed. In this regard, in the combustion exhaust gas-pretreating apparatus according to the present invention, the number of the packings to be arranged in the pretreatment tower is not particularly limited, and may be one or two or more. Further, the static-type mixer having a spiral porous blade as a packing is as described above.

The combustion exhaust gas-pretreating apparatus according to the present invention is preferably provided with a cooler for cooling the desulfurization liquid.

The cooler is provided with a desulfurization liquid recovery port for recovering the desulfurization liquid from the pretreatment tower, and a desulfurization liquid supply port for supplying the desulfurization liquid to the pretreatment tower, wherein the desulfurization liquid recovery port is connected to the desulfurization liquid outlet port of the pretreatment tower, and the desulfurization liquid supply port is connected to the desulfurization liquid inlet port of the pretreatment tower. By using such a cooler, the desulfurization liquid can be used cyclically.

The combustion exhaust gas-pretreating apparatus according to the present invention is preferably provided with a mixer for mixing the desulfurization liquid cooled by the above cooler with a replenishing liquid.

The mixer is provided with a replenishing liquid inlet port for introducing the replenishing liquid into the mixer, a desulfurization liquid inlet port for introducing the desulfurization liquid cooled by the cooler into the mixer, and a mixed liquid outlet port for discharging the obtained mixed liquid from the mixer, wherein the desulfurization liquid inlet port of the mixer is connected to the desulfurization liquid supply port of the cooler, and the mixed liquid outlet port of the mixer is connected to the desulfurization liquid inlet port of the above pretreatment tower. Apart of the desulfurization liquid to be cyclically used in the pretreatment tower is required to be discharged out of the system and to be treated, and a fresh desulfurization liquid (replenishing liquid) can be replenished by the mixer.

The method for pretreating a combustion exhaust gas according to the present invention comprises a first step of bringing a combustion exhaust gas into concurrent contact with a desulfurization liquid in a packing to perform desulfurization, dust removal, and cooling on the combustion exhaust gas, in which the combustion exhaust gas flows from the combustion exhaust gas inlet port to the combustion exhaust gas outlet port and further the desulfurization liquid flows from the desulfurization liquid inlet port to the desulfurization liquid outlet port, in a pretreatment tower being provided with the combustion exhaust gas inlet port for introducing the combustion exhaust gas into the pretreatment tower, the combustion exhaust gas outlet port for discharging the combustion exhaust gas from the pretreatment tower, the desulfurization liquid inlet port for introducing the desulfurization liquid into the pretreatment tower, the desulfurization liquid outlet port for discharging the desulfurization liquid from the pretreatment tower, and the packing that is a static-type mixer having a spiral porous blade.

The method for pretreating a combustion exhaust gas according to the present invention preferably comprises a second step of recovering the desulfurization liquid from the pretreatment tower at a position on the downstream side of the packing in a flow direction of the desulfurization liquid toward the desulfurization liquid outlet port from the desulfurization liquid inlet port, cooling the recovered desulfurization liquid, and supplying the cooled desulfurization liquid to the pretreatment tower at a position on the upstream side of the packing in the flow direction of the desulfurization liquid. Further, in the method for pretreating a combustion exhaust gas according to the present invention, it is preferred to mix the cooled desulfurization liquid with a replenishing liquid before the cooled desulfurization liquid is supplied to the pretreatment tower in the second step.

The method for pretreating a combustion exhaust gas according to the present invention can be performed by utilizing the above-described combustion exhaust gas-pretreating apparatus according to the present invention, and specifically, the first step can be performed by using the pretreatment tower, and the second step can be performed by using the cooler and the mixer.

Figure 7:
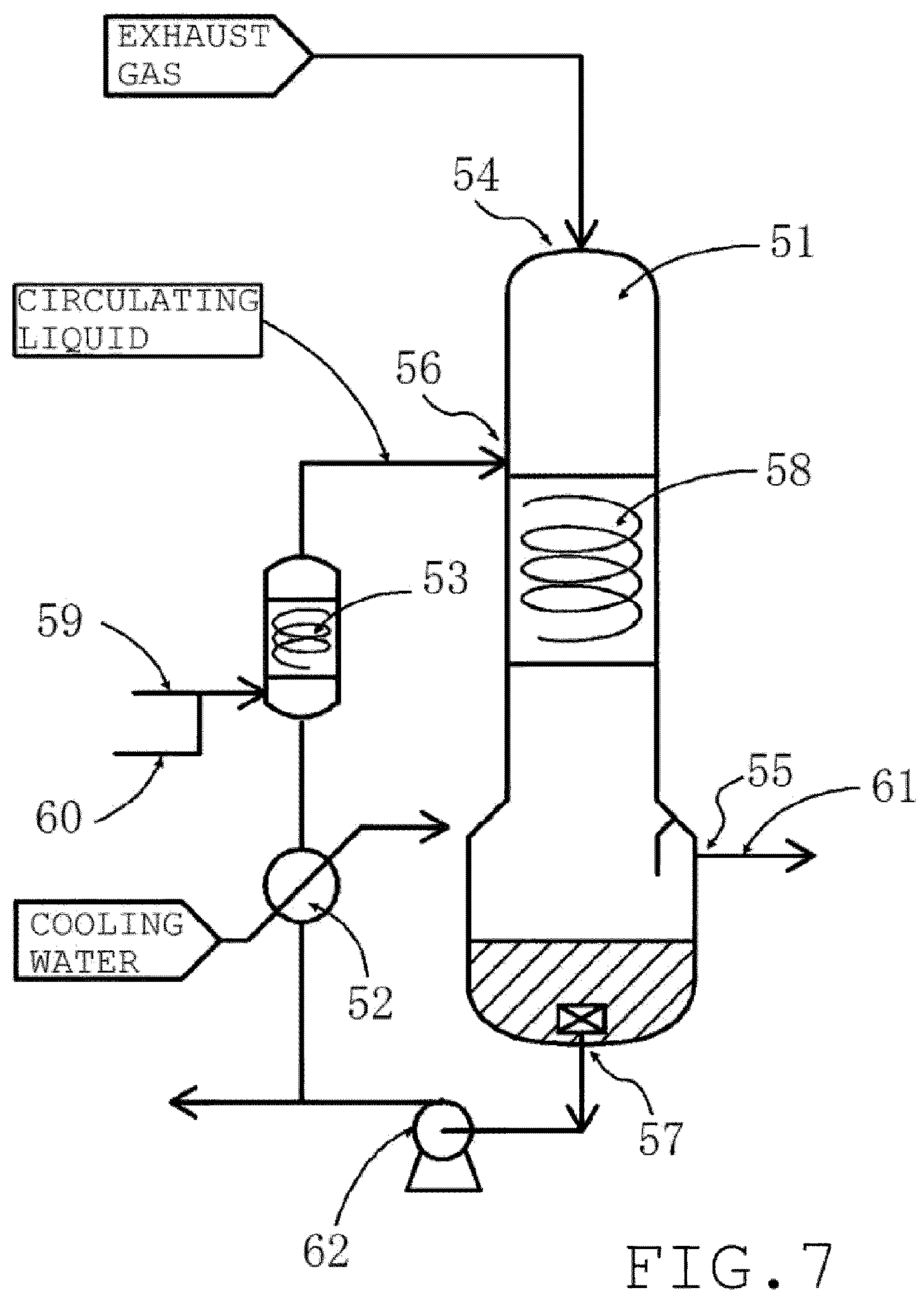
FIG. 7 is a flow diagram schematically showing an embodiment of the method for pretreating a combustion exhaust gas according to the present invention utilizing an embodiment of the combustion exhaust gas-pretreating apparatus according to the present invention, in an embodiment of the method for recovering carbon dioxide according to the present invention.

Next, embodiments of the combustion exhaust gas-pretreating apparatus according to the present invention and the method for pretreating a combustion exhaust gas according to the present invention will be described with reference to FIG. 7. FIG. 7 is a flow diagram schematically showing an embodiment of the method for pretreating a combustion exhaust gas according to the present invention utilizing an embodiment of the combustion exhaust gas-pretreating apparatus according to the present invention, in an embodiment of the method for recovering carbon dioxide according to the present invention.

The combustion exhaust gas-pretreating apparatus shown in FIG. 7 is provided with a pretreatment tower 51, a cooler 52, and a mixer 53.

The pretreatment tower 51 shown in FIG. 7 is provided with a combustion exhaust gas inlet port 54, a combustion exhaust gas outlet port 55, a desulfurization liquid inlet port 56, a desulfurization liquid outlet port 57, and a packing 58 being a static-type mixer having a spiral porous blade. In this regard, the packing 58 is arranged between the combustion exhaust gas inlet port 54 and the combustion exhaust gas outlet port 55 and between the desulfurization liquid inlet port 56 and the desulfurization liquid outlet port 57. Further, the combustion exhaust gas inlet port 54 is arranged on the upstream side of the packing 58 in a flow direction of the desulfurization liquid toward the desulfurization liquid outlet port 57 from the desulfurization liquid inlet port 56, and the desulfurization liquid inlet port 56 is arranged on the upstream side of the packing 58 in a flow direction of the combustion exhaust gas toward the combustion exhaust gas outlet port 55 from the combustion exhaust gas inlet port 54. The combustion exhaust gas introduced into the pretreatment tower 51 flows from the combustion exhaust gas inlet port 54 toward the combustion exhaust gas outlet port 55, and the desulfurization liquid introduced into the pretreatment tower 51 flows from the desulfurization liquid inlet port 56 toward the desulfurization liquid outlet port 57. In FIG. 7, by bringing the combustion exhaust gas into concurrent contact with the desulfurization liquid in the packing 58, desulfurization reaction, dust removal, and gas cooling can be efficiently performed. In this regard, the number of the packings to be arranged in the pretreatment tower is not particularly limited.

In the cooler 52 shown in FIG. 7, a desulfurization liquid recovery port for recovering the desulfurization liquid from the pretreatment tower is connected to the desulfurization liquid outlet port 57 of the pretreatment tower 51 through a flow path, and a desulfurization liquid supply port for supplying the desulfurization liquid to the pretreatment tower is connected to a desulfurization liquid inlet port of the mixer 53 through a flow path. Further, in the mixer 53 shown in FIG. 7, a mixed liquid outlet port is connected to the desulfurization liquid inlet port 56 of the pretreatment tower 51 through a flow path. In FIG. 7, a desulfurization liquid having a relatively high concentration supplied from a desulfurizing agent supply flow path 59, and a make-up water supplied from a make-up water supply flow path 60 are mixed with each other before reaching a replenishing liquid inlet port, and a replenishing liquid is prepared. In this regard, the cooler 52 is a heat exchanger, and can cool the circulating desulfurization liquid by heat exchange with water. In addition, as the mixer 53, a typical static-type mixer can be used.

In the combustion exhaust gas-pretreating apparatus shown in FIG. 7, the combustion exhaust gas passed through the packing 58 is supplied to a $CO_2$ absorption tower from the combustion exhaust gas outlet port 55 through a combustion exhaust gas supply flow path 61. On the other hand, the desulfurization liquid passed through the packing 58 is discharged from the desulfurization liquid outlet port 57 positioned in the bottom part of the pretreatment tower 51 to the outside part of the pretreatment tower 51 by a circulating liquid pump 62, a part of the desulfurization liquid passes through a desulfurization liquid recovery flow path, and is cooled by the cooler 52, subsequently the cooled desulfurization liquid is mixed with a replenishing liquid supplied from a replenishing liquid inlet port by the mixer 53 to prepare a mixed liquid, and then the mixed liquid is supplied from the desulfurization liquid inlet port 56 positioned on the upper side of the packing 58 into the pretreatment tower 51 through a desulfurization liquid circulation flow path. Further, the remainder of the desulfurization liquid discharged from the bottom part of the pretreatment tower 51 to the outside part is supplied to a sulfuric acid recovery device (not shown) through a flow path branched from the desulfurization liquid recovery flow path. For the desulfurization liquid, for example, an aqueous solution of $CaCO_3$ or NaOH is used, and further the used amine compound-containing absorption liquid may be used.

Since the conventional pretreatment tower is counter currently operated by a typical packing, the efficiency is low, and therefore, the impurities cannot be completely removed, and there has been a problem that the subsequent step is contaminated, the packing gets dirty, or the like. However, by adopting a high-performance packing as described in U.S. Pat. No. 7,510,172, and concurrently operating the pretreatment tower, (1) miniaturization of the tower, and (2) improvement of the efficiency of desulfurization reaction, dust removal, and gas cooling are achieved, and reduction of the circulating liquid flow rate (power saving) and dirt prevention can be realized.

Although not shown, the combustion exhaust gas-pretreating apparatus according to the present invention is provided with a pressure gauge P, a thermometer T, a flowmeter F, a liquid level gauge L, and a $CO_2$ analyzer, and can be equipped with a control loop composed thereof.

The carbon dioxide-recovering apparatus according to the present invention is an apparatus for recovering carbon dioxide provided with:

a $CO_2$ absorption tower for reactively absorbing $CO_2$ contained in a combustion exhaust gas into an amine compound-containing absorption liquid, in which the $CO_2$ absorption tower is provided with a combustion exhaust gas inlet port for introducing the combustion exhaust gas into the $CO_2$ absorption tower, a combustion exhaust gas outlet port for discharging the combustion exhaust gas from the $CO_2$ absorption tower, an absorption liquid inlet port for introducing the amine compound-containing absorption liquid into the $CO_2$ absorption tower, an absorption liquid outlet port for discharging the amine compound-containing absorption liquid from the $CO_2$ absorption tower, and a packing that is a static-type mixer having a spiral porous blade, wherein the packing is arranged between the combustion exhaust gas inlet port and the combustion exhaust gas outlet port and between the absorption liquid inlet port and the absorption liquid outlet port;

a $CO_2$ desorption tower for desorbing the $CO_2$ contained in the amine compound-containing absorption liquid from the amine compound-containing absorption liquid, in which the $CO_2$ desorption tower is provided with an absorption liquid inlet port for introducing the amine compound-containing absorption liquid into the $CO_2$ desorption tower, an absorption liquid outlet port for discharging the amine compound-containing absorption liquid from the $CO_2$ desorption tower, a steam inlet port for introducing steam into the $CO_2$ desorption tower, a $CO_2$ outlet port for discharging the $CO_2$ from the $CO_2$ desorption tower, and a packing that is a static-type mixer having a spiral porous blade, wherein the packing is arranged between the absorption liquid inlet port and the absorption liquid outlet port and between the steam inlet port and the $CO_2$ outlet port;

an evaporation tank for evaporating and separating impurities contained in the amine compound-containing absorption liquid from the amine compound-containing absorption liquid, in which the evaporation tank is provided with an absorption liquid inlet port for introducing the amine compound-containing absorption liquid into the evaporation tank, an absorption liquid outlet port for discharging the amine compound-containing absorption liquid evaporated and separated from the impurities from the evaporation tank, an impurity outlet port for discharging the impurities evaporated and separated from the amine compound-containing absorption liquid from the evaporation tank, and a heating jacket arranged on the outside of the evaporation tank;

a gas-liquid separator for recovering the amine compound-containing absorption liquid evaporated and separated from the impurities in the evaporation tank, in which the gas-liquid separator is provided with an absorption liquid inlet port for introducing the amine compound-containing absorption liquid evaporated and separated from the impurities into the gas-liquid separator, a gas outlet port for discharging gas obtained by gas-liquid separation, and a liquid outlet port for discharging liquid obtained by gas-liquid separation;

a decompression device for reducing pressure in the evaporation tank, in which the decompression device is connected to the evaporation tank through the absorption liquid inlet port of the gas-liquid separator, the gas outlet port of the gas-liquid separator, and the absorption liquid outlet port of the evaporation tank;

a first heat exchanger for heating the amine compound-containing absorption liquid introduced into the $CO_2$ desorption tower by heat exchange with the amine compound-containing absorption liquid in a flow direction toward the absorption liquid inlet port of the $CO_2$ absorption tower from the absorption liquid outlet port of the $CO_2$ desorption tower, in which the first heater is provided with an absorption liquid recovery port for recovering the amine compound-containing absorption liquid from the $CO_2$ desorption tower, and an absorption liquid supply port for supplying the amine compound-containing absorption liquid to the $CO_2$ desorption tower, wherein the absorption liquid recovery port and the absorption liquid supply port are connected to the $CO_2$ desorption tower at a position on the downstream side of the packing in a flow direction of the amine compound-containing absorption liquid toward the absorption liquid outlet port from the absorption liquid inlet port of the $CO_2$ desorption tower; and a second heat exchanger for performing heat exchange of the amine compound-containing absorption liquid flowing toward the absorption liquid inlet port of the $CO_2$ absorption tower from the absorption liquid outlet port of the $CO_2$ desorption tower with the amine compound-containing absorption liquid flowing toward the absorption liquid inlet port of the $CO_2$ desorption tower from the absorption liquid outlet port of the $CO_2$ absorption tower, wherein:

the absorption liquid outlet port of the $CO_2$ desorption tower is connected to the absorption liquid inlet port of the $CO_2$ absorption tower through the first heat exchanger and the second heat exchanger, and further connected to the absorption liquid inlet port of the evaporation tank, the absorption liquid outlet port of the $CO_2$ absorption tower is connected to the absorption liquid inlet port of the $CO_2$ desorption tower through the second heat exchanger, and the liquid outlet port of the gas-liquid separator is connected to the absorption liquid inlet port of the $CO_2$ absorption tower.

In the carbon dioxide-recovering apparatus according to the present invention, for the $CO_2$ absorption tower, the above-described $CO_2$ absorption tower of the carbon dioxide-absorbing apparatus according to the present invention can be applied. The carbon dioxide-recovering apparatus according to the present invention preferably comprises the carbon dioxide-absorbing apparatus according to the present invention.

In the carbon dioxide-recovering apparatus according to the present invention, for the $CO_2$ desorption tower, the above-described $CO_2$ desorption tower of the amine compound-containing absorption liquid-regenerating apparatus according to the present invention can be applied, and for the first heat exchanger, the above-described first heater of the amine compound-containing absorption liquid-regenerating apparatus according to the present invention can be applied. The carbon dioxide-recovering apparatus according to the present invention preferably comprises the amine compound-containing absorption liquid-regenerating apparatus according to the present invention.

In the carbon dioxide-recovering apparatus according to the present invention, for the evaporation tank, gas-liquid separator and decompression device, the above-described evaporation tank, gas-liquid separator and decompression device of the amine compound-containing absorption liquid-purifying apparatus according to the present invention can be applied. The carbon dioxide-recovering apparatus according to the present invention preferably comprises the amine compound-containing absorption liquid-purifying apparatus according to the present invention.

In the carbon dioxide-recovering apparatus according to the present invention, the second heat exchanger can cool the amine compound-containing absorption liquid flowing toward the absorption liquid inlet port of the $CO_2$ absorption tower from the absorption liquid outlet port of the $CO_2$ desorption tower and also heat the amine compound-containing absorption liquid flowing toward the absorption liquid inlet port of the $CO_2$ desorption tower from the absorption liquid outlet port of the $CO_2$ absorption tower.

In the carbon dioxide-recovering apparatus according to the present invention, the absorption liquid outlet port of the $CO_2$ desorption tower is connected to the absorption liquid inlet port of the $CO_2$ absorption tower, and further the absorption liquid outlet port of the $CO_2$ absorption tower is connected to the absorption liquid inlet port of the $CO_2$ desorption tower, and therefore, an amine compound-containing absorption liquid can be cyclically used in the $CO_2$ absorption and $CO_2$ desorption steps. Further, in the carbon dioxide-recovering apparatus according to the present invention, the absorption liquid outlet port of the $CO_2$ desorption tower is connected to the absorption liquid inlet port of the evaporation tank, and further the liquid outlet port of the gas-liquid separator connected to the evaporation tank is connected to the absorption liquid inlet port of the $CO_2$ absorption tower, and therefore, a part of the amine compound-containing absorption liquid cyclically used in the $CO_2$ absorption and $CO_2$ desorption steps is recovered and purified, and then the recovered amine compound-containing absorption liquid can be returned to the $CO_2$ absorption and $CO_2$ desorption steps.

The carbon dioxide-recovering apparatus according to the present invention is preferably provided with a third heat exchanger for generating steam by heating the amine compound-containing absorption liquid introduced into the $CO_2$ desorption tower by heat exchange with steam, in which the third heat exchanger is provided with an absorption liquid recovery port for recovering the amine compound-containing absorption liquid from the $CO_2$ desorption tower, and a steam supply port for supplying the steam to the $CO_2$ desorption tower, wherein the absorption liquid recovery port is connected to the $CO_2$ desorption tower at a position on the downstream side of the packing in a flow direction of the amine compound-containing absorption liquid toward the absorption liquid outlet port from the absorption liquid inlet port of the $CO_2$ desorption tower, and the steam supply port is connected to the steam inlet port of the $CO_2$ desorption tower. Further, in this case, the carbon dioxide-recovering apparatus according to the present invention is preferably provided with a superheated steam prevention device for reducing the temperature and pressure of the steam to be supplied as a heat source of the third heat exchanger and the heating jacket of the evaporation tank, in which the superheated steam prevention device is connected to the third heat exchanger and the heating jacket of the evaporation tank.

In the carbon dioxide-recovering apparatus according to the present invention, for the third heat exchanger, the above-described second heater of the amine compound-containing absorption liquid-regenerating apparatus according to the present invention can be applied. Further, in the carbon dioxide-recovering apparatus according to the present invention, for the superheated steam prevention device, the shared superheated steam prevention device to be simultaneously used for the above-described amine compound-containing absorption liquid-regenerating apparatus according to the present invention and the above-described amine compound-containing absorption liquid-regenerating apparatus according to the present invention can be applied.

The carbon dioxide-recovering apparatus according to the present invention is preferably provided with a pretreatment tower for performing desulfurization, dust removal, and cooling on the combustion exhaust gas, in which the pretreatment tower is provided with a combustion exhaust gas inlet port for introducing the combustion exhaust gas into the pretreatment tower, a combustion exhaust gas outlet port for discharging the combustion exhaust gas from the pretreatment tower, a desulfurization liquid inlet port for introducing the desulfurization liquid into the pretreatment tower, a desulfurization liquid outlet port for discharging the desulfurization liquid from the pretreatment tower, and a packing that is a static-type mixer having a spiral porous blade, wherein the packing is arranged between the combustion exhaust gas inlet port and the combustion exhaust gas outlet port and between the desulfurization liquid inlet port and the desulfurization liquid outlet port, the combustion exhaust gas inlet port is arranged on the upstream side of the packing in a flow direction of the desulfurization liquid toward the desulfurization liquid outlet port from the desulfurization liquid inlet port, and the desulfurization liquid inlet port is arranged on the upstream side of the packing in a flow direction of the combustion exhaust gas toward the combustion exhaust gas outlet port from the combustion exhaust gas inlet port. In this regard, the combustion exhaust gas outlet port of the pretreatment tower is connected to the combustion exhaust gas inlet port of the $CO_2$ absorption tower.

In the carbon dioxide-recovering apparatus according to the present invention, for the pretreatment tower, the above-described pretreatment tower of the combustion exhaust gas-pretreating apparatus according to the present invention can be applied. The carbon dioxide-recovering apparatus according to the present invention preferably comprises the combustion exhaust gas-pretreating apparatus according to the present invention.

The method for recovering carbon dioxide according to the present invention comprises:

a first step of bringing a combustion exhaust gas containing $CO_2$ into countercurrent or concurrent contact with an amine compound-containing absorption liquid in a packing to reactively absorb the $CO_2$ contained in the combustion exhaust gas into the amine compound-containing absorption liquid, in which the combustion exhaust gas flows from a combustion exhaust gas inlet port to a combustion exhaust gas outlet port and further the amine compound-containing absorption liquid flows from an absorption liquid inlet port to an absorption liquid outlet port, in a $CO_2$ absorption tower being provided with the combustion exhaust gas inlet port for introducing the combustion exhaust gas into the $CO_2$ absorption tower, the combustion exhaust gas outlet port for discharging the combustion exhaust gas from the $CO_2$ absorption tower, the absorption liquid inlet port for introducing the amine compound-containing absorption liquid into the $CO_2$ absorption tower, the absorption liquid outlet port for discharging the amine compound-containing absorption liquid from the $CO_2$ absorption tower, and the packing that is a static-type mixer having a spiral porous blade;

a second step of desorbing the $CO_2$ from the amine compound-containing absorption liquid containing the $CO_2$ by bringing the amine compound-containing absorption liquid into countercurrent contact with steam in a packing to regenerate the amine compound-containing absorption liquid and further to recover the $CO_2$, in which the amine compound-containing absorption liquid flows from an absorption liquid inlet port to an absorption liquid outlet port and further the steam flows from a steam inlet port to a $CO_2$ outlet port, in a $CO_2$ desorption tower being provided with the absorption liquid inlet port for introducing the amine compound-containing absorption liquid into the $CO_2$ desorption tower, the absorption liquid outlet port for discharging the amine compound-containing absorption liquid from the $CO_2$ desorption tower, the steam inlet port for introducing the steam into the $CO_2$ desorption tower, the $CO_2$ outlet port for discharging the $CO_2$ from the $CO_2$ desorption tower, and the packing that is a static-type mixer having a spiral porous blade;

a third step of purifying the amine compound-containing absorption liquid containing impurities by continuously or intermittently introducing the amine compound-containing absorption liquid into an evaporation tank under vacuum decompression, and by evaporating and separating the amine compound-containing absorption liquid into the impurities and a purified amine compound-containing absorption liquid, in the evaporation tank being provided with an absorption liquid inlet port for introducing the amine compound-containing absorption liquid into the evaporation tank, an absorption liquid outlet port for discharging the amine compound-containing absorption liquid evaporated and separated from the impurities from the evaporation tank, an impurity outlet port for discharging the impurities evaporated and separated from the amine compound-containing absorption liquid from the evaporation tank, and a heating jacket arranged on the outside of the evaporation tank;

a fourth step of introducing the amine compound-containing absorption liquid containing the $CO_2$ obtained in the first step into the $CO_2$ desorption tower from the absorption liquid inlet port of the $CO_2$ desorption tower;

a fifth step of introducing the amine compound-containing absorption liquid obtained in the second step in which the $CO_2$ has been removed into the $CO_2$ absorption tower from the absorption liquid inlet port of the $CO_2$ absorption tower;

a sixth step of introducing the amine compound-containing absorption liquid containing the impurities generated in the method for recovering carbon dioxide into the evaporation tank through the absorption liquid inlet port of the evaporation tank from the absorption liquid outlet port of the $CO_2$ desorption tower;

a seventh step of introducing the amine compound-containing absorption liquid obtained in the third step in which the impurities have been removed into the $CO_2$ absorption tower from the absorption liquid inlet port of the $CO_2$ absorption tower;

an eighth step of recovering a part of the amine compound-containing absorption liquid from the $CO_2$ desorption tower at a position on the downstream side of the packing in a flow direction of the amine compound-containing absorption liquid toward the absorption liquid outlet port from the absorption liquid inlet port of the $CO_2$ desorption tower, heating the recovered amine compound-containing absorption liquid by heat exchange with the amine compound-containing absorption liquid flowing toward the absorption liquid inlet port of the $CO_2$ absorption tower in the fifth step, and supplying the heated amine compound-containing absorption liquid to the $CO_2$ desorption tower at a position on the downstream side of the packing in the flow direction of the amine compound-containing absorption liquid; and a ninth step of performing heat exchange of the amine compound-containing absorption liquid flowing toward the absorption liquid inlet port of the $CO_2$ desorption tower in the fourth step with the amine compound-containing absorption liquid flowing toward the absorption liquid inlet port of the $CO_2$ absorption tower in the fifth step.

In the method for recovering carbon dioxide according to the present invention, for the above first step, the above-described first step of the method for absorbing carbon dioxide according to the present invention can be applied. The method for recovering carbon dioxide according to the present invention preferably comprises the method for absorbing carbon dioxide according to the present invention.

In the method for recovering carbon dioxide according to the present invention, for the above second step, the above-described first step of the method for regenerating an amine compound-containing absorption liquid according to the present invention can be applied, and for the above eighth step, the above-described second step of the method for regenerating an amine compound-containing absorption liquid according to the present invention can be applied. The method for recovering carbon dioxide according to the present invention preferably comprises the method for regenerating an amine compound-containing absorption liquid according to the present invention.

In the method for recovering carbon dioxide according to the present invention, for the above third step, the above-described first step of the method for purifying an amine compound-containing absorption liquid according to the present invention can be applied. The method for recovering carbon dioxide according to the present invention preferably comprises the method for purifying an amine compound-containing absorption liquid according to the present invention.

The method for recovering carbon dioxide according to the present invention preferably comprises:

a tenth step of recovering a part of the amine compound-containing absorption liquid from the $CO_2$ desorption tower at a position on the downstream side of the packing in a flow direction of the amine compound-containing absorption liquid toward the absorption liquid outlet port from the absorption liquid inlet port of the $CO_2$ desorption tower, heating the recovered amine compound-containing absorption liquid by heat exchange with steam to generate steam, and supplying the steam from the steam inlet port of the $CO_2$ desorption tower to the $CO_2$ desorption tower;

an eleventh step of supplying the steam to the heating jacket of the evaporation tank to heat the evaporation tank; and a twelfth step of reducing temperature and pressure of the steam to be used as a heat source in the tenth step and the eleventh step.

In the method for recovering carbon dioxide according to the present invention, for the above tenth step, the above-described third step of the method for regenerating an amine compound-containing absorption liquid according to the present invention can be applied, for the above eleventh step, the above-described second step of the method for purifying an amine compound-containing absorption liquid according to the present invention can be applied, and for the above twelfth step, the fifth step of the method for regenerating an amine compound-containing absorption liquid according to the present invention and the third step of the method for purifying an amine compound-containing absorption liquid according to the present invention can be applied.

The method for recovering carbon dioxide according to the present invention preferably comprises:

a thirteenth step of bringing the combustion exhaust gas into concurrent contact with a desulfurization liquid in a packing to perform desulfurization, dust removal, and cooling on the combustion exhaust gas, in which the combustion exhaust gas flows from a combustion exhaust gas inlet port to a combustion exhaust gas outlet port and further the desulfurization liquid flows from a desulfurization liquid inlet port to a desulfurization liquid outlet port, in a pretreatment tower being provided with the combustion exhaust gas inlet port for introducing the combustion exhaust gas into the pretreatment tower, the combustion exhaust gas outlet port for discharging the combustion exhaust gas from the pretreatment tower, the desulfurization liquid inlet port for introducing the desulfurization liquid into the pretreatment tower, the desulfurization liquid outlet port for discharging the desulfurization liquid from the pretreatment tower, and the packing that is a static-type mixer having a spiral porous blade; and a fourteenth step of introducing the combustion exhaust gas obtained in the thirteenth step into the $CO_2$ absorption tower from the absorption liquid inlet port of the $CO_2$ absorption tower.

In the method for recovering carbon dioxide according to the present invention, for the above thirteenth step, the above-described first step of the method for pretreating a combustion exhaust gas according to the present invention can be applied. The method for recovering carbon dioxide according to the present invention preferably comprises the method for pretreating a combustion exhaust gas according to the present invention.

The method for recovering carbon dioxide according to the present invention can be performed by utilizing the above-described carbon dioxide-recovering apparatus according to the present invention.

Next, embodiments of the carbon dioxide-recovering apparatus according to the present invention and the method for recovering carbon dioxide according to the present invention will be described with reference to FIGS. 1 and 2. Both of FIGS. 1 and 2 are flow diagrams each schematically showing an embodiment of the method for recovering carbon dioxide according to the present invention utilizing an embodiment of the carbon dioxide-recovering apparatus according to the present invention, and FIG. 1 is a detail in a case where the $CO_2$ absorption tower is in countercurrent operation, and FIG. 2 is a detail in a case where the $CO_2$ absorption tower is in concurrent operation.

The carbon dioxide-recovering apparatus shown in FIG. 1 is provided with the carbon dioxide-absorbing apparatus shown in FIG. 3, the amine compound-containing absorption liquid-regenerating apparatus shown in FIG. 5, and the amine compound-containing absorption liquid-purifying apparatus shown in FIG. 6. In this regard, an absorption liquid outlet port of a $CO_2$ desorption tower is connected to an absorption liquid inlet port of a $CO_2$ absorption tower via a first heat exchanger 72 and a second heat exchanger 73 through a flow path 71. Further, the absorption liquid outlet port of the $CO_2$ desorption tower is connected to an absorption liquid inlet port of an evaporation tank through a flow path 74. An absorption liquid outlet port of the $CO_2$ absorption tower is connected to an absorption liquid inlet port of the $CO_2$ desorption tower via the second heat exchanger 73 through a flow path 75, and the flow path 75 is branched before reaching the second heat exchanger 73, and comprises a flow path connecting to the absorption liquid inlet port of the $CO_2$ desorption tower without passing through the second heat exchanger 73. The liquid outlet port of the gas-liquid separator in the amine-containing absorption liquid-purifying apparatus shown in FIG. 6 is connected to the absorption liquid inlet port of the $CO_2$ absorption tower through a flow path 76. In this regard, the flow path 74 is a flow path that is common to the flow path 71 up to the middle of the way toward the absorption liquid inlet port of the evaporation tank, and branches at the middle for the connection to the absorption liquid inlet port of the evaporation tank. The flow path 76 is a flow path that is common to the flow path 71 from the middle of the way toward the absorption liquid inlet port of the $CO_2$ absorption tower. The flow path 74 is positioned in the upstream of the flow path 76 in a flow direction of the amine compound-containing absorption liquid toward the absorption liquid inlet port of the $CO_2$ absorption tower from the absorption liquid outlet port of the $CO_2$ desorption tower.

Figure 2:
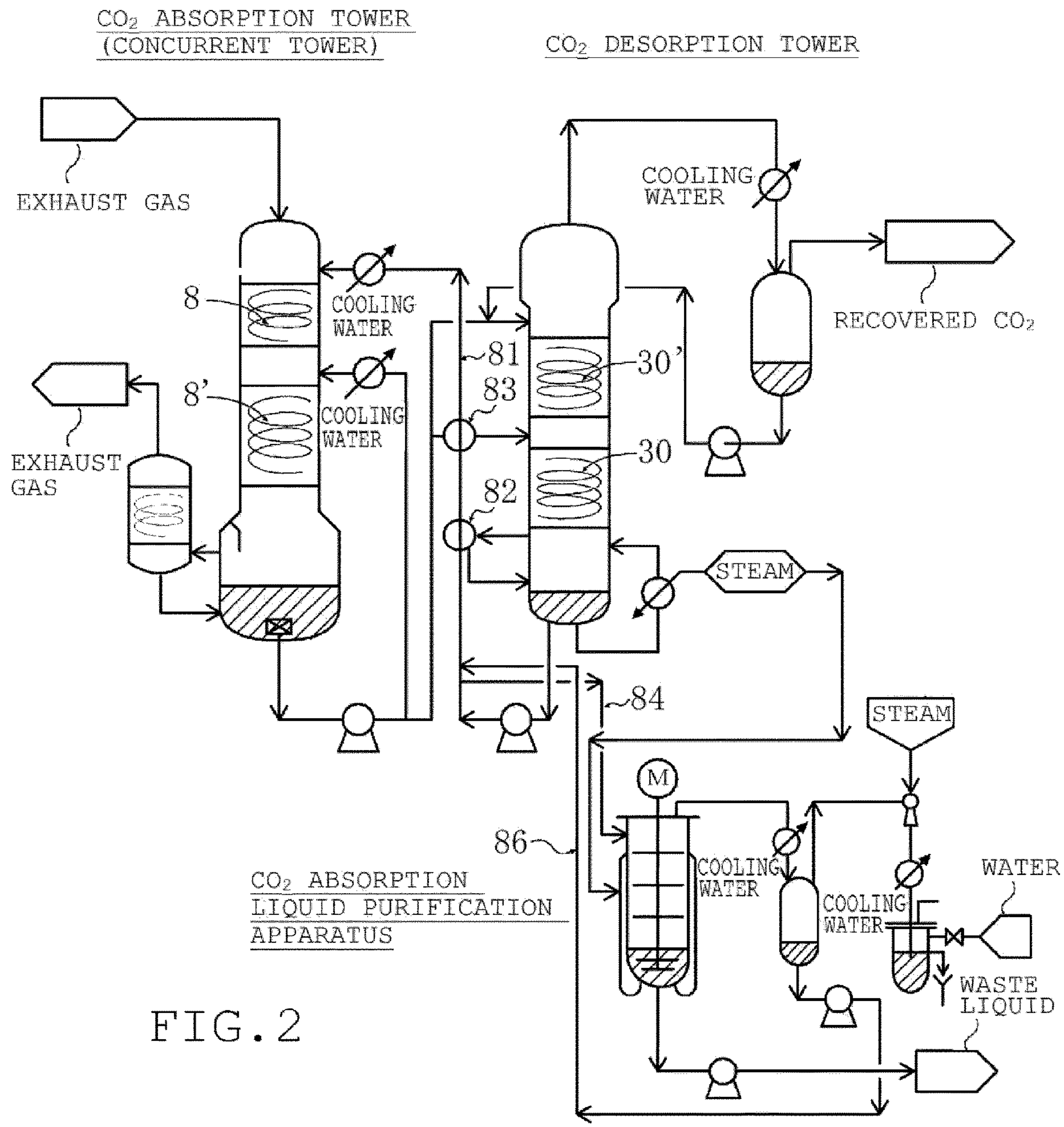
FIG. 2 is a flow diagram schematically showing an embodiment of the method for recovering carbon dioxide according to the present invention utilizing an embodiment of the carbon dioxide-recovering apparatus according to the present invention.

The carbon dioxide-recovering apparatus shown in FIG. 2 is provided with the carbon dioxide-absorbing apparatus shown in FIG. 4, the amine compound-containing absorption liquid-regenerating apparatus shown in FIG. 5, and the amine compound-containing absorption liquid-purifying apparatus shown in FIG. 6. In this regard, an absorption liquid outlet port of a $CO_2$ desorption tower is connected to an absorption liquid inlet port of a $CO_2$ absorption tower via a first heat exchanger 82 and a second heat exchanger 83 through a flow path 81. Further, the absorption liquid outlet port of the $CO_2$ desorption tower is connected to an absorption liquid inlet port of an evaporation tank through a flow path 84. An absorption liquid outlet port of the $CO_2$ absorption tower is connected to an absorption liquid inlet port of the $CO_2$ desorption tower via the second heat exchanger 83 through a flow path 85, and the flow path 85 is branched before reaching the second heat exchanger 83 similarly as in the case of FIG. 1. A liquid outlet port of a gas-liquid separator in the amine-containing absorption liquid-purifying apparatus shown in FIG. 6 is connected to the absorption liquid inlet port of the $CO_2$ absorption tower through a flow path 86. In this regard, the flow path 84 is a flow path that is common to the flow path 81 up to the middle of the way toward the absorption liquid inlet port of the evaporation tank, and branches at the middle for the connection to the absorption liquid inlet port of the evaporation tank. The flow path 86 is a flow path that is common to the flow path 81 from the middle of the way toward the absorption liquid inlet port of the $CO_2$ absorption tower. The flow path 84 is positioned in the upstream of the flow path 86 in a flow direction of the amine compound-containing absorption liquid toward the absorption liquid inlet port of the $CO_2$ absorption tower from the absorption liquid outlet port of the $CO_2$ desorption tower.

As the effects are described in the embodiments of the invention, according to the present invention, the apparatus used in the method for recovering carbon dioxide in a combustion exhaust gas can be stably operated for a long period of time, and the reduction of maintenance costs and the energy saving are achieved. In particular, by the adoption of a high-performance packing as described in U.S. Pat. No. 7,510,172, it has a significant advantage in the miniaturization of the tower. The following is a comparison of the miniaturization, taking a plant that recovers one million tons of CO2 annually as an example.

Figure 10:
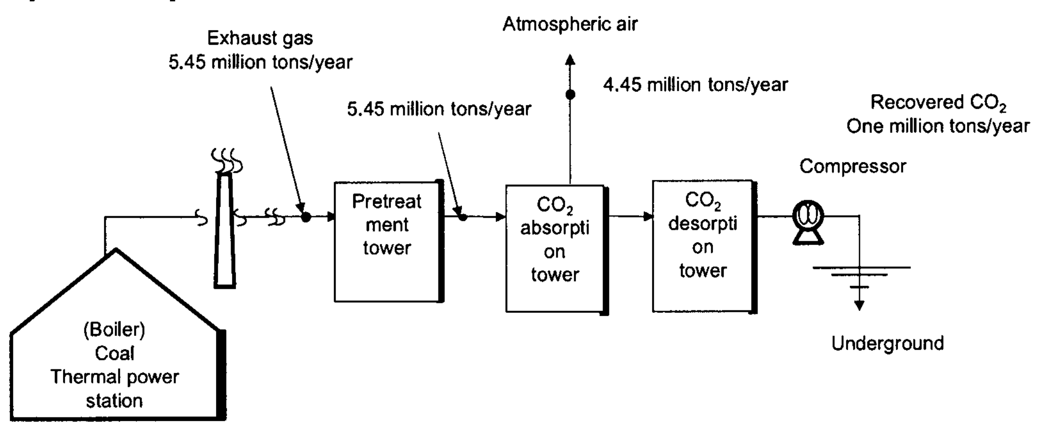
FIG. 10 is view of a Table 1 illustrating gas loads of three towers.

Table 1 in FIG. 10 shows gas loads of three towers. Naturally, the load of a combustion exhaust gas on each of the pretreatment tower and the CO2 absorption tower is larger than that on the CO2 desorption tower.

In Table 2 in FIG. 11, the miniaturization of a tower in a case where a conventional general packing (Raschig rings or the like) is changed to a high-performance packing (MU-SSPW element manufactured by MU Company Ltd.) is shown. It can be understood that in particular, by adopting a high-performance packing in two towers of a pretreatment tower and a CO2 absorption tower, and changing the operation to concurrent operation, the diameter and height of each of the towers can be reduced by half or less, and there is an effect of significant reduction in facility costs.

REFERENCE SIGNS LIST

- 1 . . . $CO_2$ absorption tower
- 2 . . . First cooler
- 3 . . . Second cooler
- 4 . . . Combustion exhaust gas inlet port
- 5 . . . Combustion exhaust gas outlet port
- 6 . . . Absorption liquid inlet port
- 7 . . . Absorption liquid outlet port
- 8, 8' . . . Packing
- 8" . . . Additional packing
- 9 . . . Connection position of first cooler and $CO_2$ absorption tower in absorption liquid recovery port side of first cooler
- 10 . . . Connection position of first cooler and $CO_2$ absorption tower in absorption liquid supply port side of first cooler
- 11 . . . Connection position of second cooler and $CO_2$ absorption tower in liquid supply port side of second cooler
- 12 . . . Connection position of second cooler and $CO_2$ absorption tower in liquid recovery port side of second cooler
- 21 . . . $CO_2$ desorption tower
- 22 . . . First heater
- 23 . . . Second heater
- 24 . . . Gas-liquid separator
- 25 . . . Superheated steam prevention device
- 26, 26' . . . Absorption liquid inlet port
- 27 . . . Absorption liquid outlet port
- 28 . . . Steam inlet port
- 29 . . . $CO_2$ outlet port
- 30, 30' . . . Packing
- 31 . . . Connection position of first heater and $CO_2$ desorption tower in absorption liquid recovery port side of first heater

32 . . . Connection position of first heater and $CO_2$ desorption tower in absorption liquid supply port side of first cooler
33 . . . Static-type mixer
34 . . . Setting thermometer for superheated steam prevention device
41 . . . Evaporation tank
42 . . . Gas-liquid separator
43 . . . Decompression device
44 . . . Absorption liquid inlet port
45 . . . Absorption liquid outlet port
46 . . . Impurity outlet port
47 . . . Heating jacket
51 . . . Pretreatment tower
52 . . . Cooler
53 . . . Mixer
54 . . . Combustion exhaust gas inlet port
55 . . . Combustion exhaust gas outlet port
56 . . . Desulfurization liquid inlet port
57 . . . Desulfurization liquid outlet port
58 . . . Packing
59 . . . Desulfurizing agent supply flow path
60 . . . Make-up water supply flow path
61 . . . Combustion exhaust gas supply flow path
62 . . . Circulating liquid pump
71 . . . Flow path
72 . . . First heat exchanger
73 . . . Second heat exchanger
74 . . . Flow path
75 . . . Flow path
76 . . . Flow path
81 . . . Flow path
82 . . . First heat exchanger
83 . . . Second heat exchanger
84 . . . Flow path
85 . . . Flow path
86 . . . Flow path
101 . . . Static-type mixer
102 . . . Passage pipe
103 . . . First blade body
104 . . . Bored hole
105 . . . First inner cylindrical pipe
106 . . . Second blade body
107 . . . Bored hole
108 . . . Second inner cylindrical pipe
109 . . . Opening part
M . . . Motor
P . . . Pressure gauge
T . . . Thermometer
F . . . Flowmeter
L . . . Liquid level gauge

The invention claimed is:

1. A carbon dioxide-recovering apparatus, comprising:

a $CO_2$ absorption tower to reactively absorb $CO_2$ contained in a combustion exhaust gas into an amine compound-containing absorption liquid, wherein the $CO_2$ absorption tower is provided with a combustion exhaust gas inlet port to introduce the combustion exhaust gas into the $CO_2$ absorption tower, a combustion exhaust gas outlet port to discharge the combustion exhaust gas from the $CO_2$ absorption tower, an absorption liquid inlet port to introduce the amine compound-containing absorption liquid into the $CO_2$ absorption tower, an absorption liquid outlet port to discharge the amine compound-containing absorption liquid from the $CO_2$ absorption tower, and a packing that is a static-type mixer having a spiral porous blade, wherein the packing is arranged between the combustion exhaust gas inlet port and the combustion exhaust gas outlet port and between the absorption liquid inlet port and the absorption liquid outlet port;

a $CO_2$ desorption tower to desorb the $CO_2$ contained in the amine compound-containing absorption liquid from the amine compound-containing absorption liquid, wherein the $CO_2$ desorption tower is provided with an absorption liquid inlet port to introduce the amine compound-containing absorption liquid into the $CO_2$ desorption tower, an absorption liquid outlet port to discharge the amine compound-containing absorption liquid from the $CO_2$ desorption tower, a steam inlet port to introduce steam into the $CO_2$ desorption tower, a $CO_2$ outlet port to discharge the $CO_2$ from the $CO_2$ desorption tower, and a packing that is a static-type mixer having a spiral porous blade, wherein the packing is arranged between the absorption liquid inlet port and the absorption liquid outlet port and between the steam inlet port and the $CO_2$ outlet port;

an evaporation tank to evaporate and separate impurities contained in the amine compound-containing absorption liquid from the amine compound-containing absorption liquid, wherein the evaporation tank is provided with an absorption liquid inlet port to introduce the amine compound-containing absorption liquid into the evaporation tank, an absorption liquid outlet port to discharge the amine compound-containing absorption liquid evaporated and separated from the impurities from the evaporation tank, an impurity outlet port to discharge the impurities evaporated and separated from the amine compound-containing absorption liquid from the evaporation tank, and a heating jacket arranged on the outside of the evaporation tank;

a gas-liquid separator to recover the amine compound-containing absorption liquid evaporated and separated from the impurities in the evaporation tank, wherein the gas-liquid separator is provided with an absorption liquid inlet port to introduce the amine compound-containing absorption liquid evaporated and separated from the impurities into the gas-liquid separator, a gas outlet port to discharge gas obtained by gas-liquid separation, and a liquid outlet port to discharge liquid obtained by gas-liquid separation;

a decompression device to reduce pressure in the evaporation tank, wherein the decompression device is connected to the evaporation tank through the absorption liquid inlet port of the gas-liquid separator, the gas outlet port of the gas-liquid separator, and the absorption liquid outlet port of the evaporation tank;

a first heat exchanger that is provided with an absorption liquid recovery port to recover the amine compound-containing absorption liquid from the $CO_2$ desorption tower and an absorption liquid supply port to supply the amine compound-containing absorption liquid to the $CO_2$ desorption tower, and the first heat exchanger is to heat the amine compound-containing absorption liquid that has been recovered from the $CO_2$ desorption tower from the absorption liquid recovery port by heat exchange with the amine compound-containing absorption liquid in a flow direction toward the absorption liquid inlet port of the $CO_2$ absorption tower from the absorption liquid outlet port of the $CO_2$ desorption tower, wherein the absorption liquid recovery port and the absorption liquid supply port are connected to the $CO_2$ desorption tower at a position on the downstream side of the packing in a flow direction of the amine compound-containing absorption liquid toward the absorption liquid outlet port from the absorption liquid inlet port of the $CO_2$ desorption tower; and a second heat exchanger to perform heat exchange of the amine compound-containing absorption liquid flowing toward the absorption liquid inlet port of the $CO_2$ absorption tower from the absorption liquid outlet port of the $CO_2$ desorption tower with the amine compound-containing absorption liquid flowing toward the absorption liquid inlet port of the $CO_2$ desorption tower from the absorption liquid outlet port of the $CO_2$ absorption tower, wherein the absorption liquid outlet port of the $CO_2$ desorption tower is connected to the absorption liquid inlet port of the $CO_2$ absorption tower through the first heat exchanger and the second heat exchanger, and connected to the absorption liquid inlet port of the evaporation tank, the absorption liquid outlet port of the $CO_2$ absorption tower is connected to the absorption liquid inlet port of the $CO_2$ desorption tower through the second heat exchanger, and the liquid outlet port of the gas-liquid separator is connected to the absorption liquid inlet port of the $CO_2$ absorption tower through the first heat exchanger and the second heat exchanger.

2. The carbon dioxide-recovering apparatus according to claim 1, further comprising:

a third heat exchanger to generate steam by heating the amine compound-containing absorption liquid introduced into the $CO_2$ desorption tower by heat exchange with steam, wherein the third heat exchanger is provided with an absorption liquid recovery port to recover the amine compound-containing absorption liquid from the $CO_2$ desorption tower, and a steam supply port to supply the steam to the $CO_2$ desorption tower, wherein the absorption liquid recovery port is connected to the $CO_2$ desorption tower at a position on the downstream side of the packing in a flow direction of the amine compound-containing absorption liquid toward the absorption liquid outlet port from the absorption liquid inlet port of the $CO_2$ desorption tower, and the steam supply port is connected to the steam inlet port of the $CO_2$ desorption tower, wherein the steam to be supplied as a heat source of the third heat exchanger and the heating jacket of the evaporation tank is reduced in temperature and pressure to prevent superheated steam.

3. The carbon dioxide-recovering apparatus according to claim 1, further comprising a pretreatment tower to perform desulfurization, dust removal, and cooling on the combustion exhaust gas, wherein the pretreatment tower is provided with a combustion exhaust gas inlet port to introduce the combustion exhaust gas into the pretreatment tower, a combustion exhaust gas outlet port to discharge the combustion exhaust gas from the pretreatment tower, a desulfurization liquid inlet port to introduce the desulfurization liquid into the pretreatment tower, a desulfurization liquid outlet port to discharge the desulfurization liquid from the pretreatment tower, and a packing that is a static-type mixer having a spiral porous blade, wherein the packing is arranged between the combustion exhaust gas inlet port and the combustion exhaust gas outlet port and between the desulfurization liquid inlet port and the desulfurization liquid outlet port, the combustion exhaust gas inlet port is arranged on the upstream side of the packing in a flow direction of the desulfurization liquid toward the desulfurization liquid outlet port from the desulfurization liquid inlet port, and the desulfurization liquid inlet port is arranged on the upstream side of the packing in a flow direction of the combustion exhaust gas toward the combustion exhaust gas outlet port from the combustion exhaust gas inlet port, wherein the combustion exhaust gas outlet port of the pretreatment tower is connected to the combustion exhaust gas inlet port of the $CO_2$ absorption tower.

* * * * *